US012542364B2

(12) United States Patent
Wong et al.

(10) Patent No.: US 12,542,364 B2
(45) Date of Patent: Feb. 3, 2026

(54) DIELECTRIC ANTENNAS FOR INTEGRATED SENSING AND COMMUNICATION

(71) Applicant: City University of Hong Kong, Kowloon (HK)

(72) Inventors: Hang Wong, Kowloon (HK); Wenjian Sun, Kowloon (HK)

(73) Assignee: City University of Hong Kong, Kowloon (HK)

( * ) Notice: Subject to any disclaimer, the term of this patent is extended or adjusted under 35 U.S.C. 154(b) by 238 days.

(21) Appl. No.: 18/317,209

(22) Filed: May 15, 2023

(65) Prior Publication Data

US 2024/0387998 A1 Nov. 21, 2024

(51) Int. Cl.
*H01Q 9/04* (2006.01)
*H01Q 1/38* (2006.01)
*H01Q 1/48* (2006.01)

(52) U.S. Cl.
CPC ............ *H01Q 9/0485* (2013.01); *H01Q 1/38* (2013.01); *H01Q 1/48* (2013.01)

(58) Field of Classification Search
CPC ............ H01Q 21/005; H01Q 21/0068; H01Q 9/0485; H01Q 1/40; H01Q 1/48; H01P 3/08; H01P 3/16; H01P 3/081; H01P 3/003
See application file for complete search history.

(56) References Cited

U.S. PATENT DOCUMENTS 9,172,135 B2* 10/2015 Sudo .................... H01Q 19/005
9,172,142 B2* 10/2015 Sudo ...................... H01Q 21/06
11,089,595 B1 8/2021 Frigon et al.
2016/0322708 A1* 11/2016 Tayfeh Aligodarz ........................ H01Q 21/0087
2021/0210860 A1 7/2021 Ahadi et al.
2022/0271435 A1 8/2022 Hao et al.

FOREIGN PATENT DOCUMENTS

CN 115313047 11/2022

OTHER PUBLICATIONS

IEEE Transactions On Antennas and Propagation, vol. 66, No. 6, Jun. 2018; A Simple Technique for Open-Stopband Suppression in Periodic Leaky-Wave Antennas Using Two Nonidentical Elements Per Unit Cell Juhua Liu , Member, IEEE, Wenlong Zhou, and Yunliang Long, Senior Member, IEEE.
IEEE Transactions On Antennas and Propagation, vol. 62, No. 2, Feb. 2014 Millimeter-Wave Low Temperature Co-Fired Ceramic Leaky-Wave Antenna and Array Based on the Substrate Integrated Image Guide Technology Yu Jian Cheng, Member, IEEE, Yong XinGuo, Senior Member, IEEE, Xiao YueBao, and Kung Bo Ng, Member, IEEE.

* cited by examiner

*Primary Examiner* — Monica C King
(74) *Attorney, Agent, or Firm* — Renner, Kenner, Greive, Bobak, Taylor & Weber

(57) ABSTRACT

A dielectric antenna that includes a substrate layer, a ground layer on top of the substrate layer, and a dielectric body on top of the ground layer. The dielectric body has an elongated shape. The dielectric antenna further contains an electric wall structure on a top of the dielectric body for cutting links among higher-order modes of the dielectric antenna. The invention aims to investigate novel antenna solutions for integrated sensing and communication (ISAC) applications.

10 Claims, 24 Drawing Sheets

DIELECTRIC ANTENNAS FOR INTEGRATED SENSING AND COMMUNICATION

FIELD OF INVENTION

This invention relates to dielectric antennas, for example those intended for high integrated sensing and communication purposes.

BACKGROUND OF INVENTION 6G wireless communications defined with intelligence to connect people, vehicles, robots, and things will bring the human beings into a digital society as well as a smart city. Industry leaders and scientists have started preparing and investigating 6G networks with integrated sensing and communication infrastructures. The key to intelligent system or smart city is the sensory ability, which enables high-accuracy localization, high-resilience reconfiguration of the network, and ultra-fast-ultra-secure communications. This distinctiveness of sensing-assisted communications brings higher-quality and reliable wireless performance with accurate beamforming, faster beam reconstruction, high efficiency in tracking channel state information, and efficient network capacities. Future cellular networks will exploit dense cells to carry out perceptive features on the communication network for efficient uses of the frequency spectrum, channel capacity, high-accuracy localization and effective power management. In fact, new and advanced antenna technologies will be indispensable to support the realization of the fabulous 6G network.

Existing antenna technologies of wideband, MIMO (Multi-Input Multi-Output), millimeter-wave (mmW), beamforming, and reconfigurable functions have contributed to the success of communication or sensory respectively. However, simply combining the two types of antenna systems results in low reliability in the intelligent network of 6G. There is a need for an improved antenna that can support sensing and communication features for the future communication network.

SUMMARY OF INVENTION

Accordingly, the present invention, in one aspect, is a dielectric antenna that includes a substrate layer, a ground layer on top of the substrate layer, and a dielectric body on top of the ground layer. The dielectric body has an elongated shape. The dielectric antenna further contains an electric wall structure on a top of the dielectric body for cutting links among higher-order modes of the dielectric antenna.

In some embodiments, the electric wall structure includes a metal line configured on the top of the dielectric body.

In some embodiments, the metal line is substantially perpendicular to a longitudinal direction of the dielectric body.

In some embodiments, the electric wall structure further contains a plurality of air vias on the dielectric body which is adjacent to the metal line.

In some embodiments, the plurality of air vias is symmetrically located on two sides of the metal line.

In some embodiments, the electric wall structure contains a plurality of said metal lines which is parallel to each other and which is perpendicular to a longitudinal direction of the dielectric body.

In some embodiments, the plurality of metal lines is distributed equidistantly from each other.

In some embodiments, the dielectric antenna further contains a plurality of antenna elements each corresponding to one of the plurality of metal lines. The plurality of antenna elements borders each other at one of the plurality of metal lines.

In some embodiments, the substrate layer comprises a first microstrip feedline and a second microstrip feedline. The ground layer includes a first coupling slot that has a longitudinal direction intersecting with that of the first microstrip feedline, and a second coupling slot that has a longitudinal direction intersecting with that of the second microstrip feedline.

In some embodiments, the first microstrip feedline and the second microstrip feedline correspond respectively to a first antenna element and a second antenna element defined in the dielectric body. The first and second antenna elements border each other at the metal line.

In some embodiments, the dielectric body is formed at its two ends respectively a first coplanar waveguide feeding port and a second coplanar waveguide feeding port.

In some embodiments, the first coplanar waveguide feeding port and the second coplanar waveguide feeding port correspond respectively to a first antenna element and a second antenna element defined in the dielectric body.

One can see that embodiments of the invention provide novel antenna solutions for integrated sensing and communication (ISAC) applications, which tackle the bottleneck for existing sensing and communication networks by introducing compact, highly-integrative, cost-effective, and high-gain antenna solutions for enabling the functions of ISAC. Thanks to the co-design of a dielectric antenna with broadside and leaky radiations for integrated sensing and communication, a totally connected dielectric antenna can be provided for mmW applications by adding a design of travelling-wave antenna in the connected structure, which can be upgraded to obtain a phase scanning function for communication.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

In the drawings, like numerals indicate like parts throughout the several embodiments described herein.

DETAILED DESCRIPTION

Embodiments of the invention provide solutions of generating millimeter-wave leaky-wave radiation and standing-wave radiation on a same antenna, thus providing two antenna functions. To provide some basic introductions, leaky-wave radiation, is a type of travelling-wave radiation. A travelling-wave antenna uses a traveling wave on a guiding structure as the main radiating mechanism, and in comparison, a standing-wave antenna radiates by a standing wave operating in the resonator structure. The biggest difference between the standing-wave antenna and the leaky-wave antenna, is the radiation performance at different frequencies. For standing-wave antennas, all of the directions of the radiation patterns are aligned in the same direction; while for leaky-wave antennas, the directions of the radiation patterns are changed according to frequency because of changing phase difference of each radiation element. This approach can also be used for standing-wave antennas, which is named as phased-array technology. The advantage of leaky-wave antenna is that all the directions of the patterns are radiated at the same time, which can enhance the system's time efficiency. On the contrary, the standing-wave antenna with the phased-feed-network can sequentially scan all the directions at a single frequency, which may save the system spectrum resources.

Figure 1A:
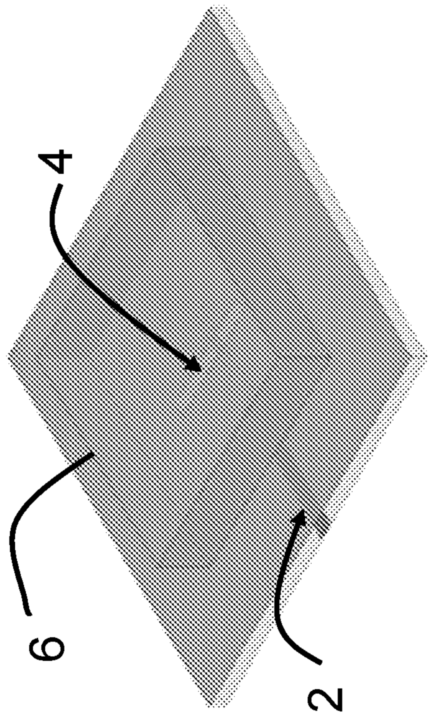
Fig. 1a (prior art)
FIG. 1*a* illustrates the structure of a conventional DRA (Dielectric Resonator Antenna) with a single dielectric block.
Figure 1B:
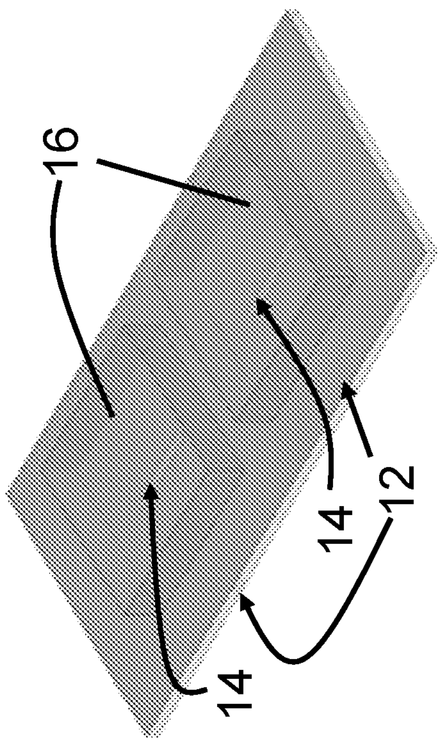
Fig. 1b (prior art)
FIG. 1*b* illustrates the structure of another conventional 1×2 DRA with two unconnected dielectric blocks.

FIGS. 1*a* and 1*b* illustrate two conventional DRAs. The antenna in FIG. 1*a* is a simple DRA having a single dielectric block 6 that is excited by an aperture 4 and a slot 2, and the antenna is adapted to cover a frequency range from 24 GHz to 28 GHz, i.e., a millimeter-wave region that provides higher communication capacity. The dielectric block 6 is used instead of metal because dielectric materials have no metal loss. For the antenna in FIG. 1*a*, the E-field distributions at three different frequencies within the above frequency range are all fundamental mode—TE111.

For the antenna in FIG. 1*b*, it is a small 1×2 sub-array containing two separate dielectric blocks 16 each defining a separate antenna element together with a corresponding aperture 14 and a corresponding slot 12. Because of the coupling between the two antenna elements, the E-field distributions would be a little different at different frequencies, while the radiation performance could be kept stable. However, drawbacks related to the DRAs in FIGS. 1*a* and 1*b* are the fabrication problems.

Figure 1C:
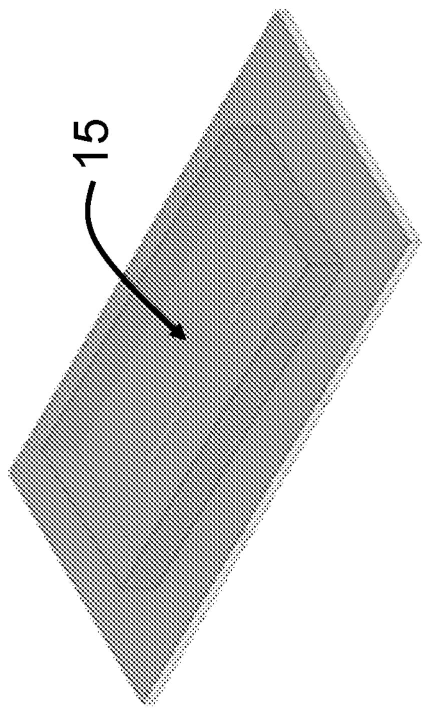
FIG. 1*c* illustrates the structure of a 1×2 dielectric antenna with a connected structure for two antenna elements, according to an embodiment of the invention.
Figure 8:
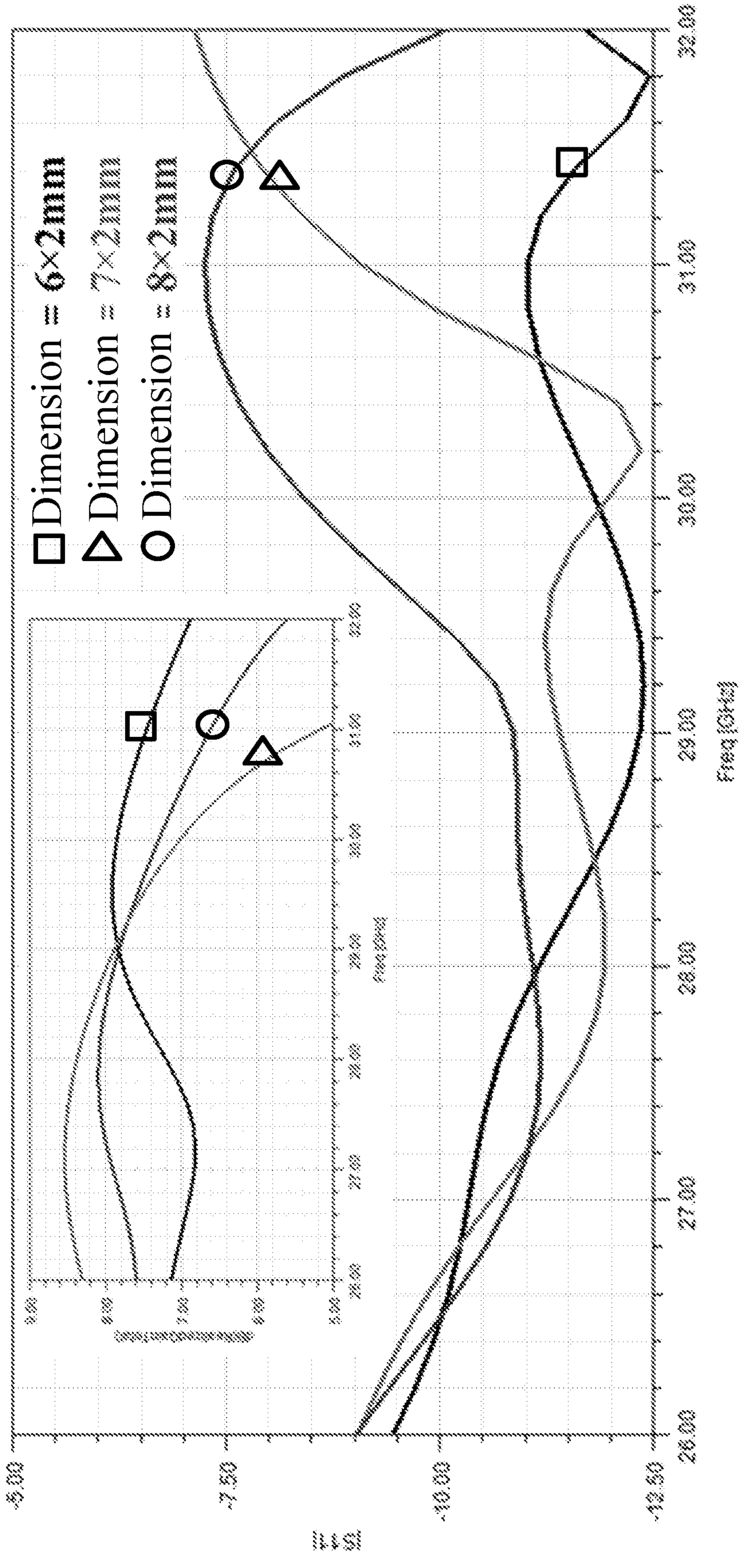
FIG. 8 illustrates simulated |S11| and gain results of antennas similar to that in FIG. 3, but with different lengths of the antenna.

Turning to FIG. 1*c*, which shows a 1×2 dielectric antenna similar to that of FIG. 1*b*, but with the two dielectric blocks connected (i.e., the dielectric blocks become a continuous, single piece denoted by the arrow 15). The single dielectric block 15 has an elongated shape, and as the dielectric block 15 is a single dielectric resonator, the modes of the antenna tend to be distributed in the middle of the elongated dielectric block 15. In fact, several modes can be seen in the antenna of FIG. 1*c* at different frequencies. As shown in FIG. 8, a desirable effect of the antenna in FIG. 1*c* is that exiting multi-modes extend the impedance bandwidth, while they also result in an unstable radiation performance. Furthermore, FIG. 8 shows simulated |S11| and gain results of the antenna in FIG. 1*c* with the dimension of the dielectric block 15 in the horizontal plane being different. It can be seen that when the dimension of the dielectric block 15 is 6×2 mm, the antenna has the best |S11| as compared to the other two dimensions. On the other hand, the realized gain achieved by the antenna in the three dimensions are close to each other as each dimension has good and bad gains in different frequency regions. Nonetheless, it is found that the width of the dielectric block 15 cannot be used to adjust the resonant frequency of antenna, as the length which is double or more of the width (as shown in FIG. 8) has much lesser effect to the resonant frequency than the width and height. Hence, when the scale of the antenna in FIG. 1*c* increases, the situation would become more complex and the antenna is difficult to optimize, leading to a very unstable radiation performance.

Figure 1D:
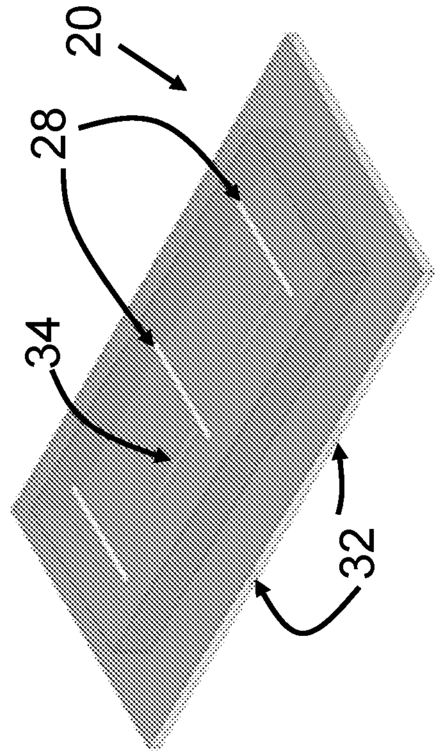
FIG. 1*d* illustrates the structure of a 1×2 dielectric antenna with a connected structure and an electric wall structure, according to another embodiment of the invention.
Figure 2:
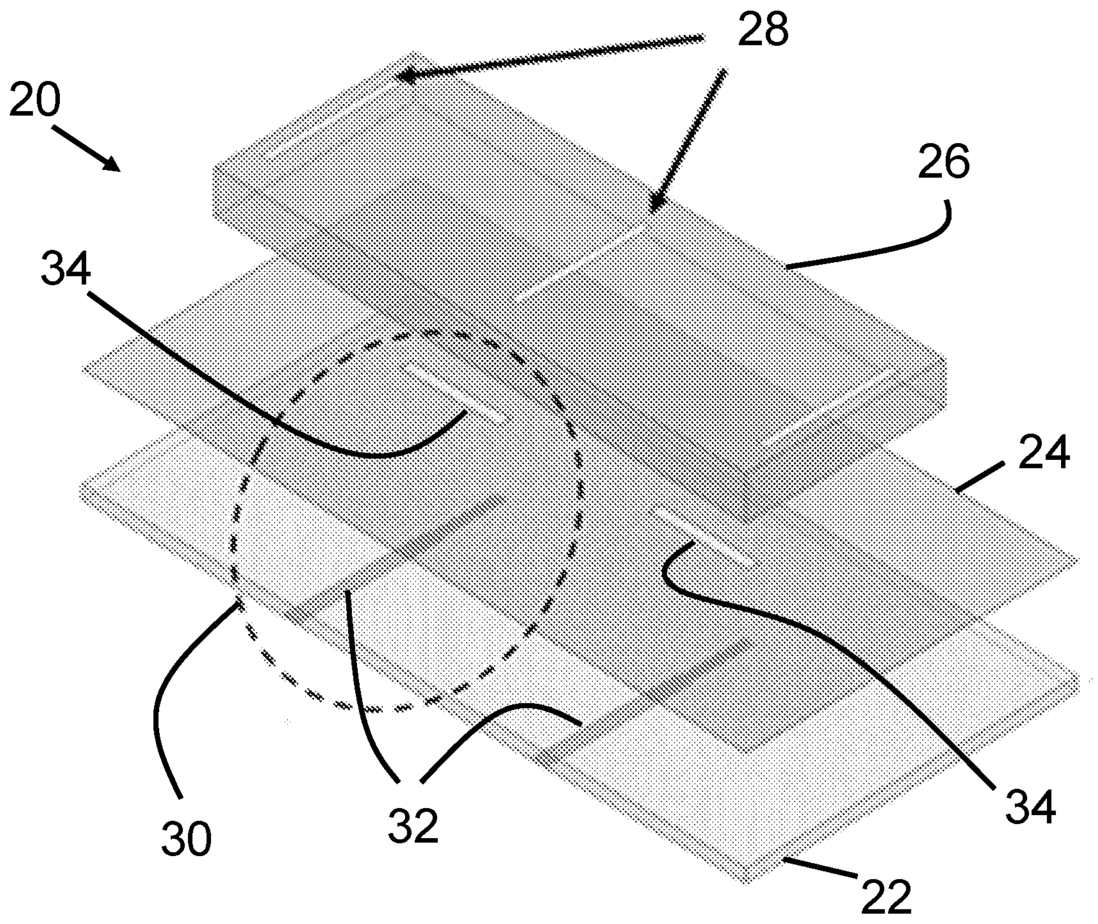
FIG. 2 is an exploded view showing different layers in the dielectric antenna of FIG. 1*d*.

In FIGS. 1*d* and 2, another 1×2 dielectric antenna 20 according to an embodiment of the invention is shown. The antenna 20 contains two antenna elements similar to the antenna in FIG. 1*c*. The antenna 20 also contains three layers namely (from bottom to top) a substrate layer 22, a ground layer 24, and a dielectric body 26 as a DRA layer. The ground layer 24 is interposed between the dielectric body 26 and the substrate layer 22.

The substrate layer 22 contains two microstrip feedlines 32 respectively for the two antenna elements. In this embodiment, the two microstrip feedlines 32 are parallel to each other and their input ports are located at the same edge of the substrate layer 22. In particular, as can be seen in FIG. 1, each of the microstrip feedlines 32 has an elongated shape and extends from the same edge of the substrate layer 22 toward a center (not shown) of the substrate layer 22 in the horizontal plane (i.e., a virtual plane not shown and parallel to each of the three PCB substrate layers). In addition, the two microstrip feedlines 32 are symmetrically configured in the substrate layer 22 about a virtual, central line (not shown) of the substrate layer 22 that extends a width direction thereof. The microstrip feedlines 32 are arranged on a bottom side of the substrate layer 22 and are metallic planar feedlines.

The ground layer 24 accommodates two coupling slots 34 each correspond to a respective microstrip feedline 32. A pair 30 including a coupling aperture/slot 34 and its corresponding microstrip feedline 32 is part of a corresponding antenna element. Thus, as there are two pairs of coupling slots 34 and microstrip feedline 32 in the antenna system 20 of FIGS. 1*d* and 2, there are two antenna elements. Each of the two coupling slots 34 has a longitudinal direction intersecting with that of its corresponding microstrip feedline 32, although in FIG. 2 as the ground layer 24 and the substrate layer 22 are offset from each other for illustration purposes a coupling slot 34 is not shown to be directly intersecting its corresponding microstrip feedline 32. As best shown in FIG. 1*d*, each coupling slot 34 has a projection in the horizontal plane that intersects with its corresponding microstrip feedline 32, and in particular the longitudinal direction of the coupling slot 34 forms a right angle with that of its corresponding microstrip feedline 32. As shown in FIG. 2, in terms of physical dimensions, each microstrip feedline 32 has a length more than one half of the width of the substrate layer 22.

It can be seen from FIGS. 1*d* and 2 that the dielectric body 26 has an elongated shape, and its longitudinal direction is perpendicular to that of the microstrip feedline 32. The dielectric body 26 also has a thickness (in the vertical direction in FIG. 1) that is larger than those of the ground layer 24 and the substrate layer 22. In one implementation, the dielectric body 26 is made from Rogers™ RO3006™ laminates and has a thickness of 1.28 mm, while the substrate later 22 is made from Rogers™ RO4003C$^{M}$ laminates and has a thickness of 0.4 mm. In other words, the antenna 20 can manufactured using standard PCB (printed circuit board) fabrication technologies.

The antenna 20 further includes an electric wall structure on a top of the dielectric body 26 for cutting links among higher-order modes in the resonating part of the antenna 20. In particular, the electric wall structure includes three metal lines 28 that are configured on top of the dielectric body 26. The metal lines 28 are parallel to each other and are orthogonal to a longitudinal direction of the dielectric body 26. In other words, the metal lines 28 are parallel to the microstrip feedline 32 in the substrate layer 22. The metal lines 28 extend along most of the width of the dielectric body 26, and are distributed equidistantly from each other. The metal lines 28 can be seen as boundaries of the antenna elements, or “partitioning” the dielectric body 26 so as to form a partitioning dielectric resonator antennas. The three metal lines 28 delimit the two antenna elements as mentioned above where the two antenna elements border each other at the middle one of the three metal line 28. One can see that projection of the area of the dielectric body 26 between any two adjacent metal lines 28 on the horizontal plane, overlaps with projections of a corresponding coupling slot 30 and a corresponding microstrip feedline 32.

Now turn to the operations of the antenna 20. One can see that compared to the antenna in FIG. 1*c*, the main difference in the antenna 20 is the metal lines 28. The metal lines 28 are added to improve the radiance performance of the dielectric resonator for the antenna in FIG. 1*c*, the use of the connected structure helps reduce the dimension of the antenna when the frequency of the antenna is increased to millimeter-wave, the size of resonator antenna will need to be decreased, which is hard to fabricate as a three-dimensional structure. The connected structure is therefore necessary to form the leaky-wave antenna.

However, the connected structure results in many higher-order modes in the resonant part (not the travelling-wave/leaky-wave part), which cannot provide a stable radiation performance. This is the reason why the metal lines 28 are added in the top of the connected structure to form the antenna 20. As the profile of the DRA is small enough, the printed metal lines 28 can be seen as an electric wall so that it will destroy the links among the high-modes, which produces a standing-wave distribution of the electric field at the designed frequency just like classical separated antenna structures. On the other hand, the elongated shape of the rectangular dielectric body 26 provides a feasibility to excite traveling wave distributions on the dielectric rod. The metal lines 28 act as a perturbation structure, which allows traveling waves to play the role of leaky-wave radiation as a dielectric rod antenna. As such, in antenna 20 the designs of both a traveling-wave antenna and a standing-wave antenna are implemented in the same connected structure.

The antenna 20 enables the use of multiple frequencies with a wide scanning range of angles to check fast sensing based on the leaky-wave radiation. This greatly enhances the time efficiency of ISAC systems that incorporate the antenna 20, since the speed of communication in the ISAC system is improved when the rapid sensing approach can be implemented. The performance of the antenna 20 is better than traditional antenna networks in terms of frequency scanning and beam manipulations including directing, steering, and splitting. For example, in recent antenna networks, operators can use the same MIMO antenna arrays at base stations to realize both sensing and communications. However, in these networks the communication beamforming signal needs to wait for a while from the sensing signals of discrete checking. The longer checking time can provide more accurate information for the communication beam forming, but it creates more latency for the system. Simply put, in conventional art there is no satisfactory antenna that could cater for performances for both communication signals and sensing signals, since coding, hardware requirements, etc. of sensing and communication functions are completely different from each other. It is impossible to change the function of a given antenna from one to another by just reforming the beam.

Figure 3:
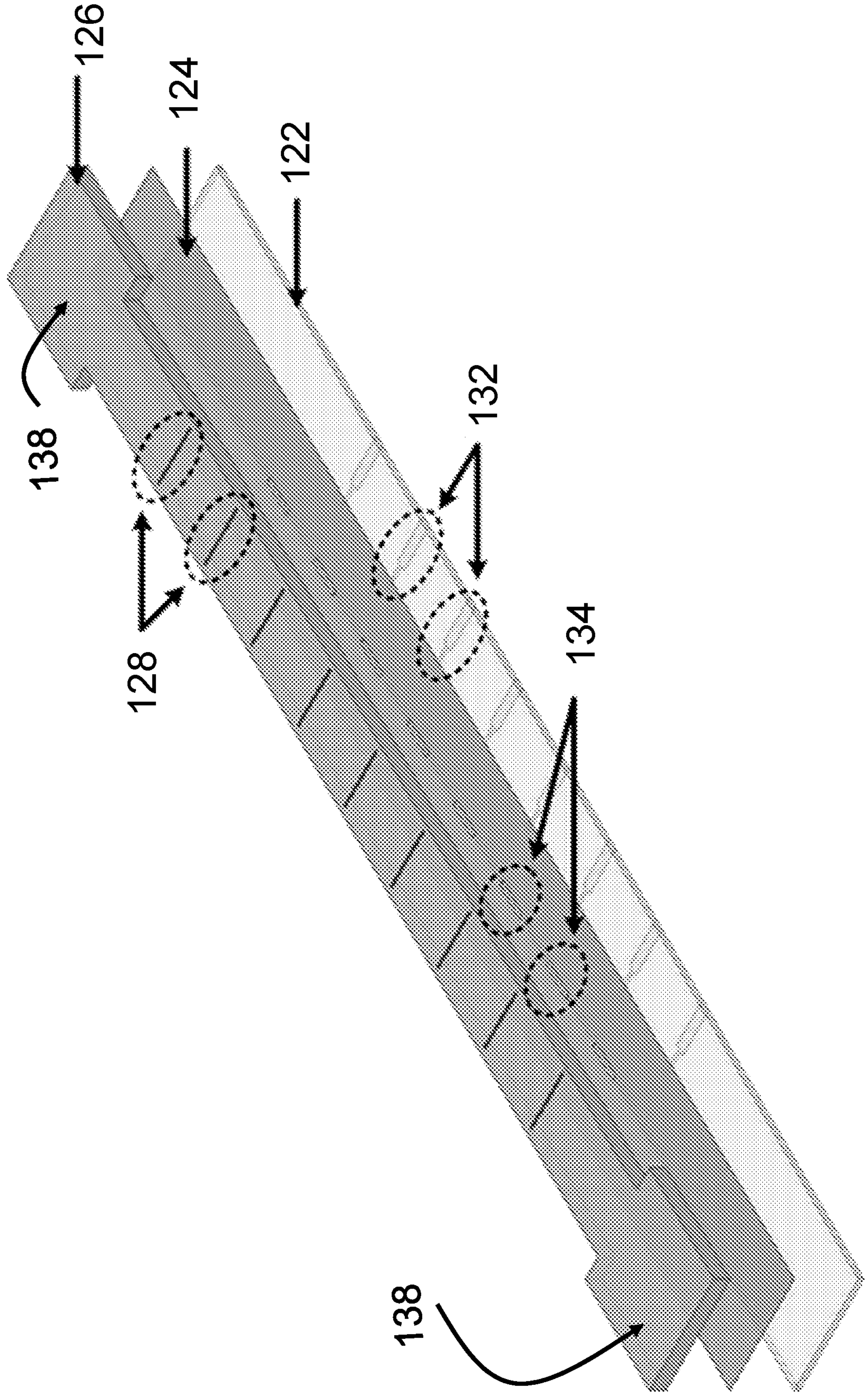
FIG. 3 shows a 1×8 dielectric antenna according to another embodiment of the invention, which has the same unit design as the antenna in FIG. 1*d*.

Turning to FIG. 3, which shows another embodiment of the invention that is a 1×8 dielectric antenna 120 that has the same unit design as the antenna in FIGS. 1*d* and 2. The unit design here refers to the structure of a single antenna element, which is the same for the antenna 120 in FIG. 3 and the antenna 20 in FIGS. 1*d* and 2. The only differences between the two antennas 20, 120 are the number of antenna elements and thus the length of the antennas. In fact, for the antenna 120 in FIG. 3 the traveling-wave needs a length much larger than that of the resonant wavelength for higher directivity or gain performance, which can obtain Higher perceptual resolution, so for the traveling-wave it only has effectively one single element (formed by the eight individual antenna elements) with two ports, while for resonator part, it has eight antenna elements.

The antenna 120 also has a three-layer structure including a substrate layer 122, a ground layer 124 and a dielectric body 126. For each of the eight antenna elements, there are two printed metal lines 128 configured on a top of the dielectric body 126, one coupling slot 134 in the ground layer 124, and one microstrip feedline 132 in the substrate layer 122. The dielectric body 126 in one implementation is also fabricated using a Rogers™ RO3006™ laminate with a thickness of 1.28 mm and a width of 6 mm. The length of the dielectric block 126 is not a sensitive parameter. In contrast, the spacing between the perturbed structures that is the spacing between metal lines 128 (which in the specific implementation is 7.5 mm) is the key parameter, which could affect the resonant frequency. In the specific implementation described above, the metal lines 128 each has a width of 0.15 mm. As the antenna 120 is completely based on PCB technology, there is almost no machining error. At the bottom, the substrate is made of Rogers 4003C with a thickness of 0.305 mm.

Figure 4A:
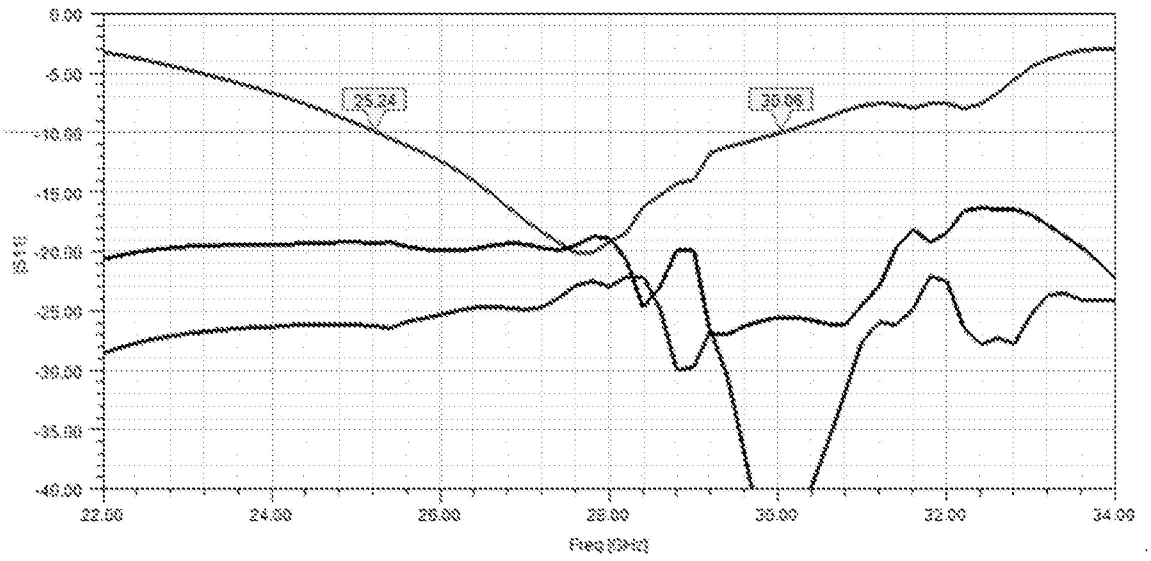
FIG. 4*a* depicts simulated S-parameters results of one port in the antenna in FIG. 3.
Figure 4B:
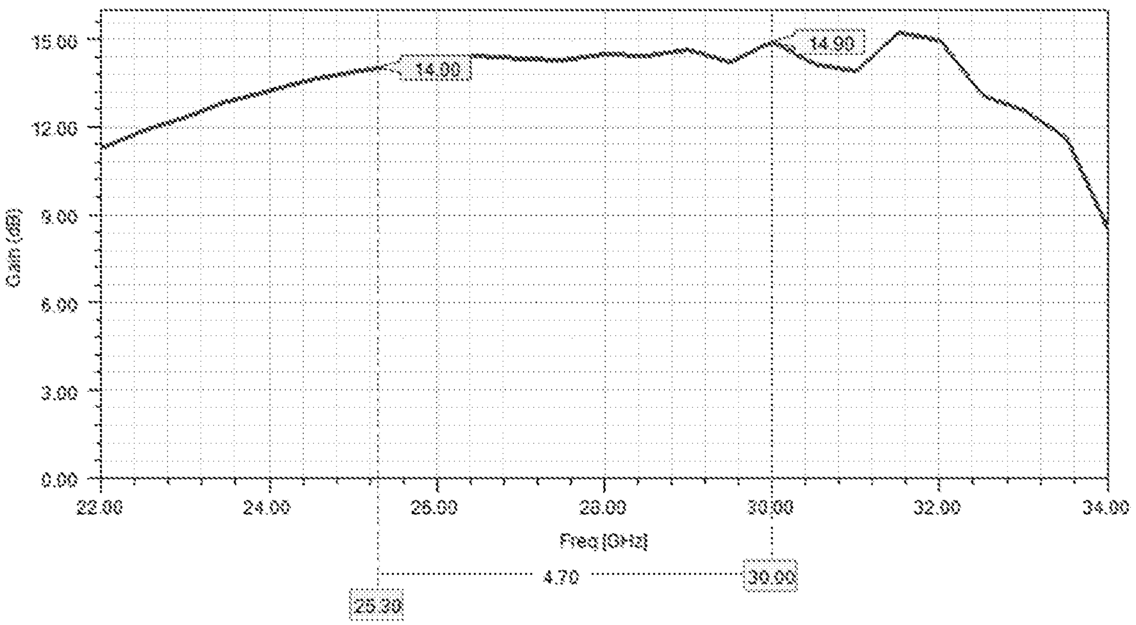
FIG. 4*b* depicts simulated gain results (frequency response) of the antenna in FIG. 3.
Figure 5C:
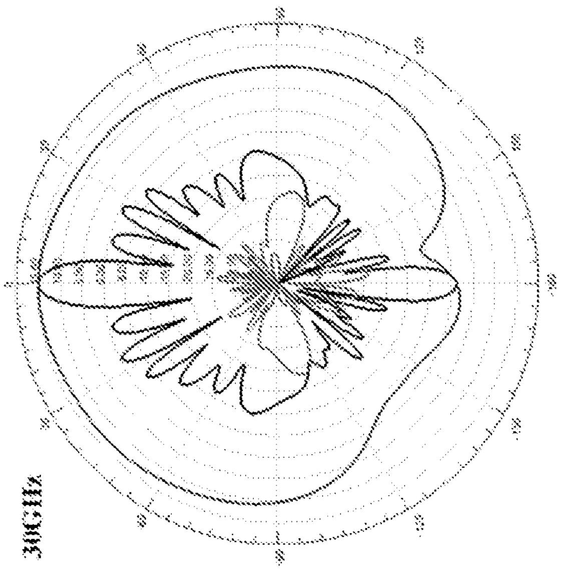
FIGS. 5*a*, 5*b* and 5*c* illustrate respectively the simulated radiation patterns of the antenna in FIG. 3 at 25 GHz, 28 GHz and 30 GHz.
Figure 5B:
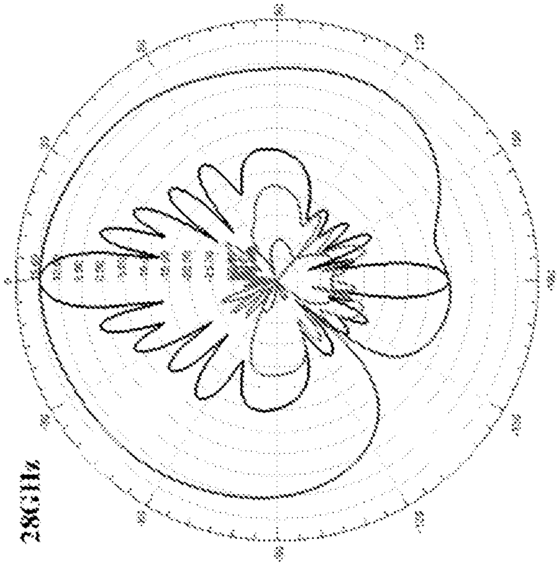
Figure 5A:
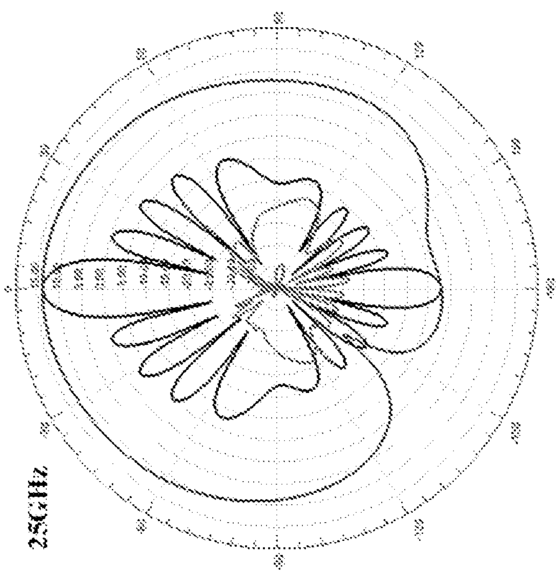

As shown in FIG. 4*a*, the antenna 120 provides a impedance bandwidth from 25.3 GHz to 30 GHz, while the isolations with adjacent and re-adjacent structures ports are better than −18 dB. The radiation performance is shown in FIG. 4*b*, which shows that the peak gain is 14.9 dBi, and the 3-dB gain bandwidth contains the impedance bandwidth, yet the radiation patterns are symmetrical as shown in in all of FIGS. 5*a*-5*c*. FIG. 2.4(*b*). Overall, the performance of the antenna 120 is acceptable.

Figure 6:
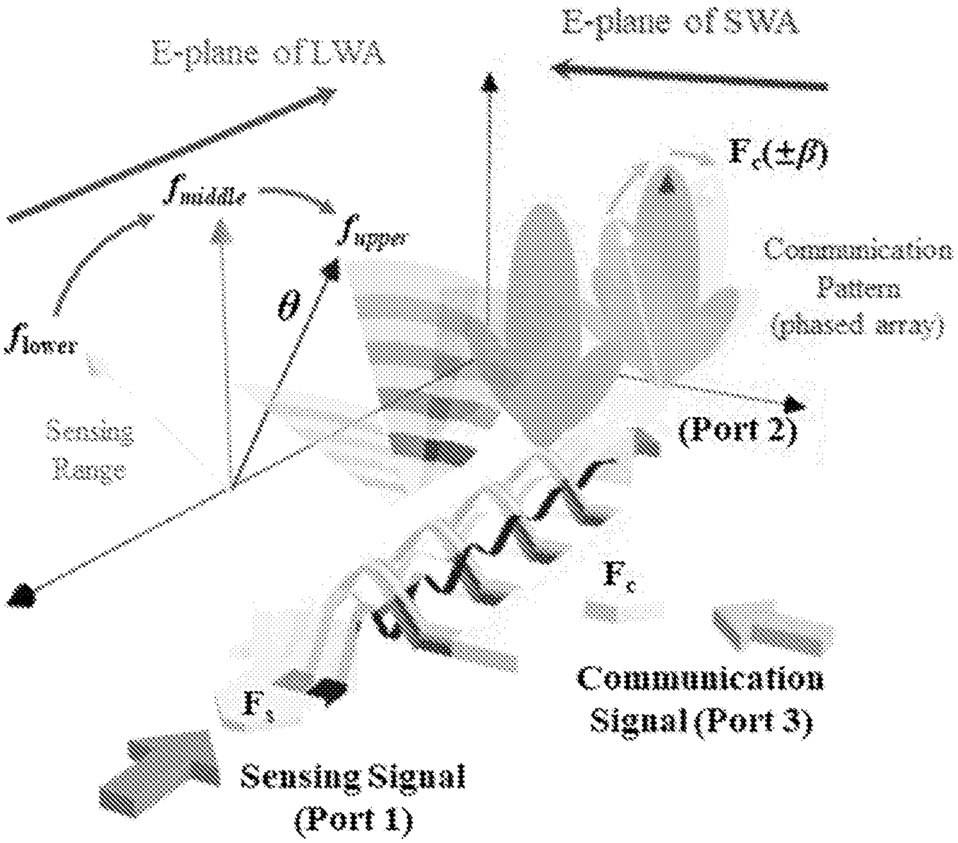
FIG. 6 is an illustration showing the working principles in terms of signal transmissions of the antenna in FIG. 3.

FIGS. 6, 7*a*, 7*b* and 7*c* illustrate conceptually the working principle of the antenna 120, which also applies to the antenna 20 in FIG. 1*d* and FIG. 2. The dielectric body 126 on its two ends along the longitudinal direction are configured with two ports 138 as shown in FIG. 3, which correspond to Port 1 and Port 2 in FIG. 6. As shown in FIG. 6, the sensing signal can make use of Port 1, Port 2 or both for difference pattern along a longer dimension of the antenna, in the leaky-wave part. On the other hand, the antenna 120 has a communication port which is the Port 3 shown in FIG. 6, that is formed by the multiple microstrip feedlines 132, and the third port is for a communication signal which moves along a shorter dimension of the antenna 120. It should be noted that FIG. 6 shows four sub-ports of Port 3, but this is for illustration only, as the number of the sub-ports can be any number such as two (represented by the two microstrip feedline 32 in FIG. 1*d* and FIG. 2) or eight (represented by the eight microstrip feedline 132 in FIG. 3). Preferably, the number of sub-ports of Port 3 is at least eight because if the number is too small, then peaks in the sensing signal cannot be easily distinguished, which increases the difficulty in sensing. FIG. 6 shows both the E-plane of the LWA (leaky-wave antenna) for the sensing signal, and the E-plane of the SWA (standing-wave antenna) for the communication signal. The transmission directions of the two signals are orthogonal to each other, so the same antenna structure is reused for the two functions at the same time.

Figure 7A:
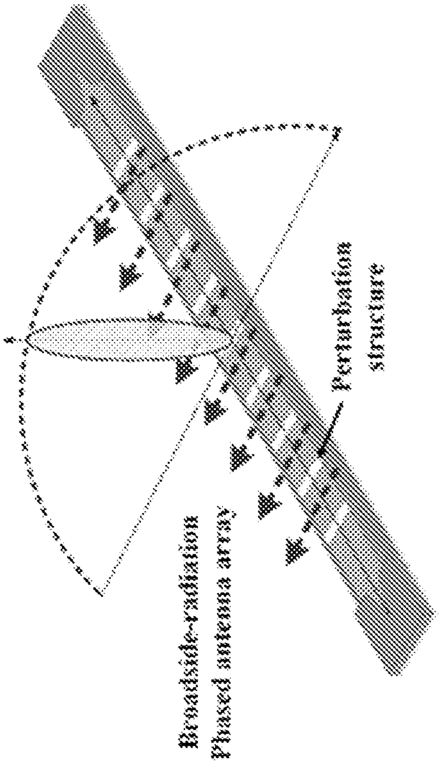
FIGS. 7*a*, 7*b* and 7*c* illustrate respectively the resonant mode, the transmission mode, and the superimposed mode of the antenna in FIG. 3.
Figure 7B:
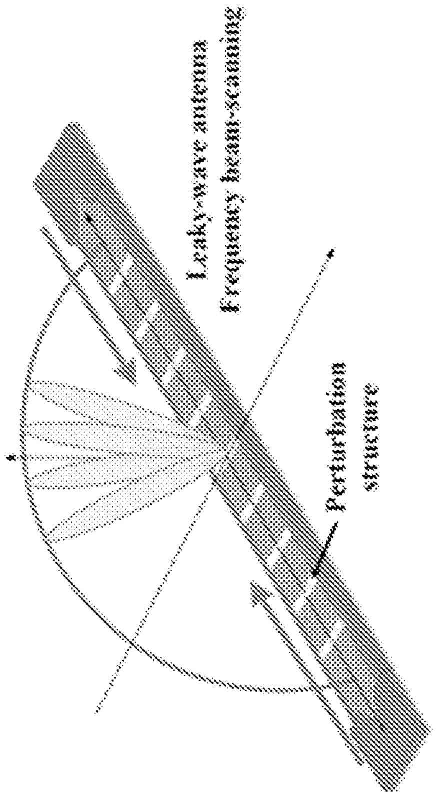
Figure 7C:
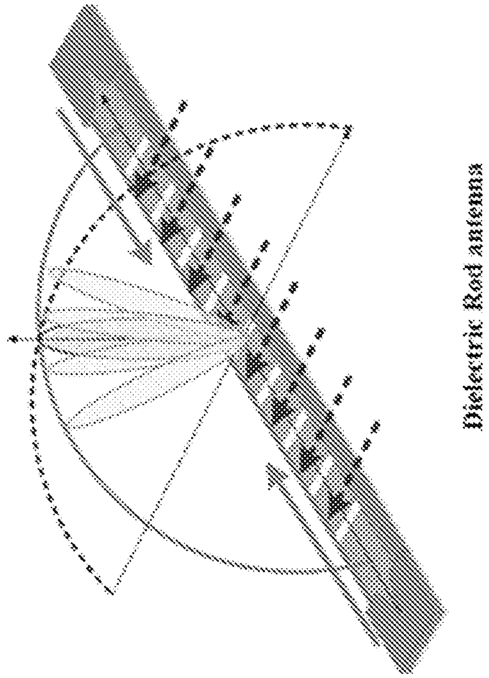

The concept as shown in FIG. 6 was developed though two processes, which is shown in FIGS. 7*a*-7*c*. The original purpose was to solve the fabrication problem in relation to millimeter-wave DRA. When the frequency goes up to millimeter-wave, the size of antenna element, the distance between each element, and the relative location of the feeding structure between antenna elements, all become very small. It is impossible to guarantee no machining error with the conventional manufacturing technologies. The connected structure was then introduced to reduce the size of the dielectric antenna, and with the connected structure such as those shown in FIG. 1*c* and FIG. 1*d*, fundamental modes of the antenna are replaced with higher-order modes by using multiple-feeding. Because of using the higher-order modes, the overall size of the dielectric antenna is much bigger than the traditional antenna element. The problems of the distance between two antenna elements, and the relative location of the feeding structure, also can be solved. The biggest problem then is how to maintain the radiation pattern—how to control the E-field distribution of the higher-order modes. As shown in FIGS. 7*a*-7*c*, by adding a row of equally spaced perturbed structures (e.g. metal lines), all the E-field distributions are maintained at the same direction, which provides a good radiation pattern. After roughly achieving the above goal, it is found that the antenna structure is the same as the leaky-wave antenna based on DIL (dielectric image line). Hence, the perturbed structure is optimized to realize leaky-wave antenna with a frequency beam scanning. As the E-filed distributions of the LWA and SWA parts are orthogonal, it is possible to use the resonant mode to realize phased-array for communication and utilize the leaky-wave antenna with frequency beam scanning for sensing.

Figure 9:
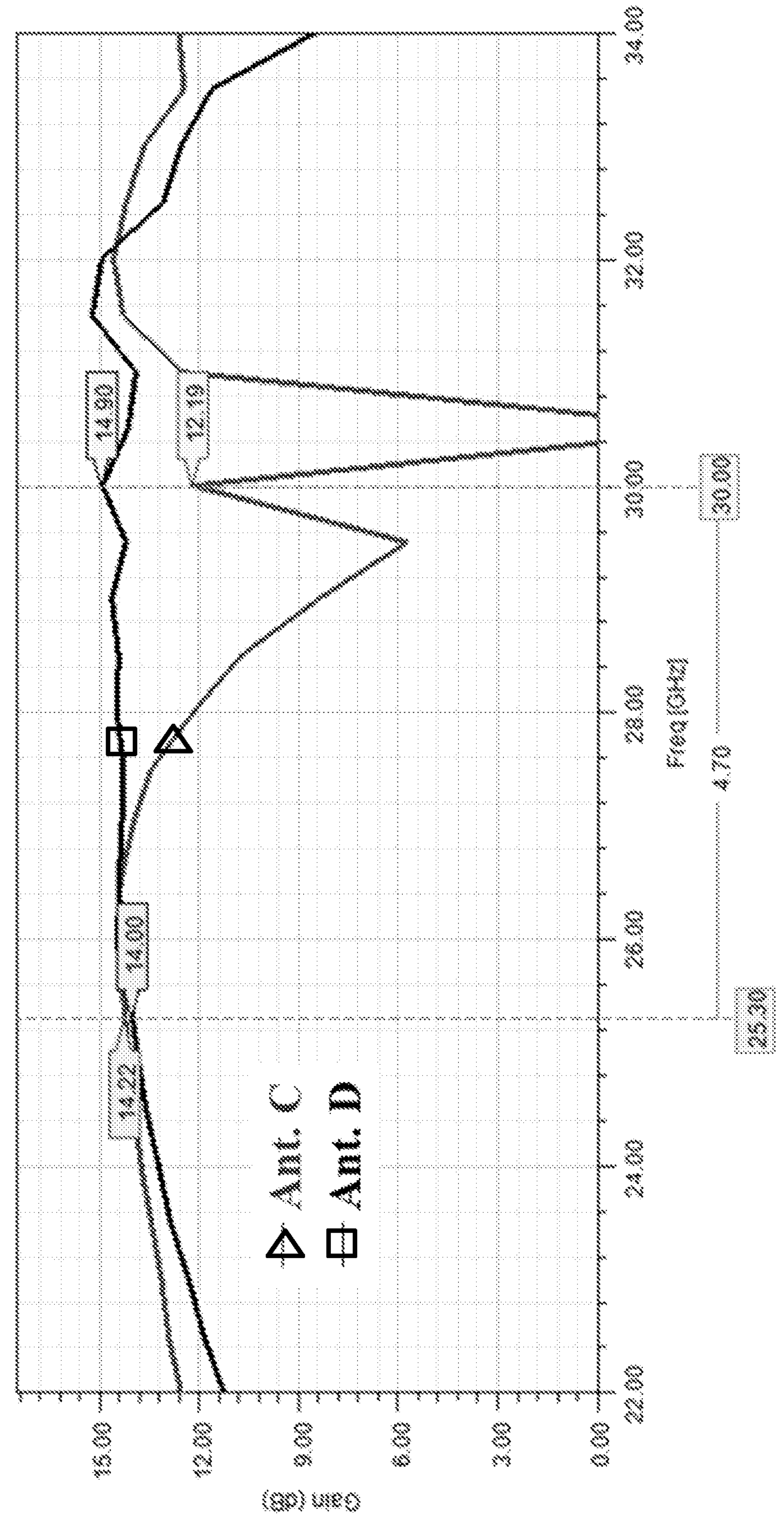
FIG. 9 shows simulated gain results of two 1×8 antennas that have respectively the same unit design as the antennas in FIGS. 1*c* and 1*d*.

FIG. 9 shows the simulated radiation comparison between the antenna 120 (designated as Ant. D in FIG. 9), and the antenna in FIG. 1*c* when it is extended to a 1×8 antenna array (designated as Ant. C in FIG. 9). One can see that gain of the antenna 120 is relatively uniform in the frequency range from 22 GHz to 34 GHz, but that of the antenna as extended from the antenna in FIG. 1*c* has a significant gain drop between 26 GHz and 31 GHz. Thus, it is demonstrated that adding perturbed structures on the dielectric body (e.g., metal lines) has contributed to stableness of radiation performance of the antenna.

Figure 10A:
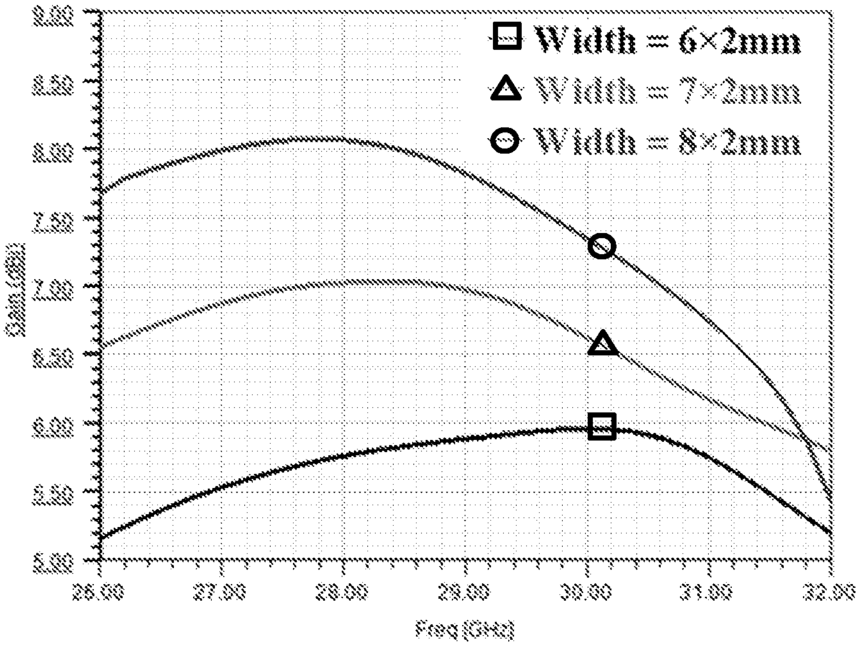
FIG. 10*a* illustrates simulated gain results of a 1×8 antenna that has the same unit design as the antenna in FIG. 1*d* but with various lengths of the dielectric body.
Figure 10B:
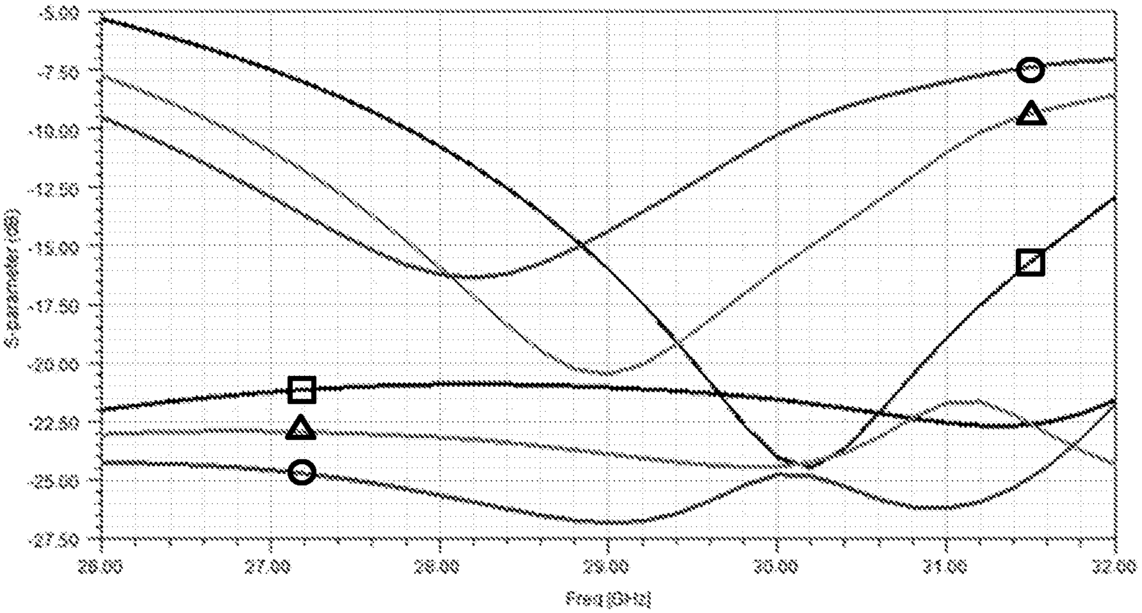
FIG. 10*b* illustrates simulated |S11| and |S21| of the 1×8 antenna of FIG. 10*a*.

To provide further elaborations on the perturbed structures, the root cause of gain instability in antennas similar to that in FIG. 1*c* is the reverse E-fields of higher-order modes. The presence of reverse E-fields that prevents radiation throughout the antenna is a normal broadside radiation pattern. The key to solve the unstable problem is how to reduce and diminish the reverse E-fields among the modes. Hence, a series of metal strip lines are utilized to solve this problem as those shown in FIGS. 1*d*, 2 and 3. For the antennas in FIGS. 1*d*, 2 and 3, all the E-fields can keep the same direction within the whole operating band, which means they are adapted to provide a very stable radiation performance. FIGS. 10*a* and 10*b* show the simulated results of gains and S parameters respectively for the antenna 20 in FIGS. 1*d* and 2, at different lengths of the dielectric body 26. When the distance between the metal lines 28 increases, all the simulated results are offset at the same time. The resonator frequency decreases due to the enlargement of the size of the dielectric body 26 as a result of the increase of the spacing between the metal lines 28. The isolation becomes better due to the increased distance between two ports of the leaky-wave part, and the improvement of gain performance is due to the larger radiation aperture. Based on the antenna structure in FIGS. 1*d* and 2, one can easily enlarge the scale of the antenna quickly and easily.

Figure 11A:
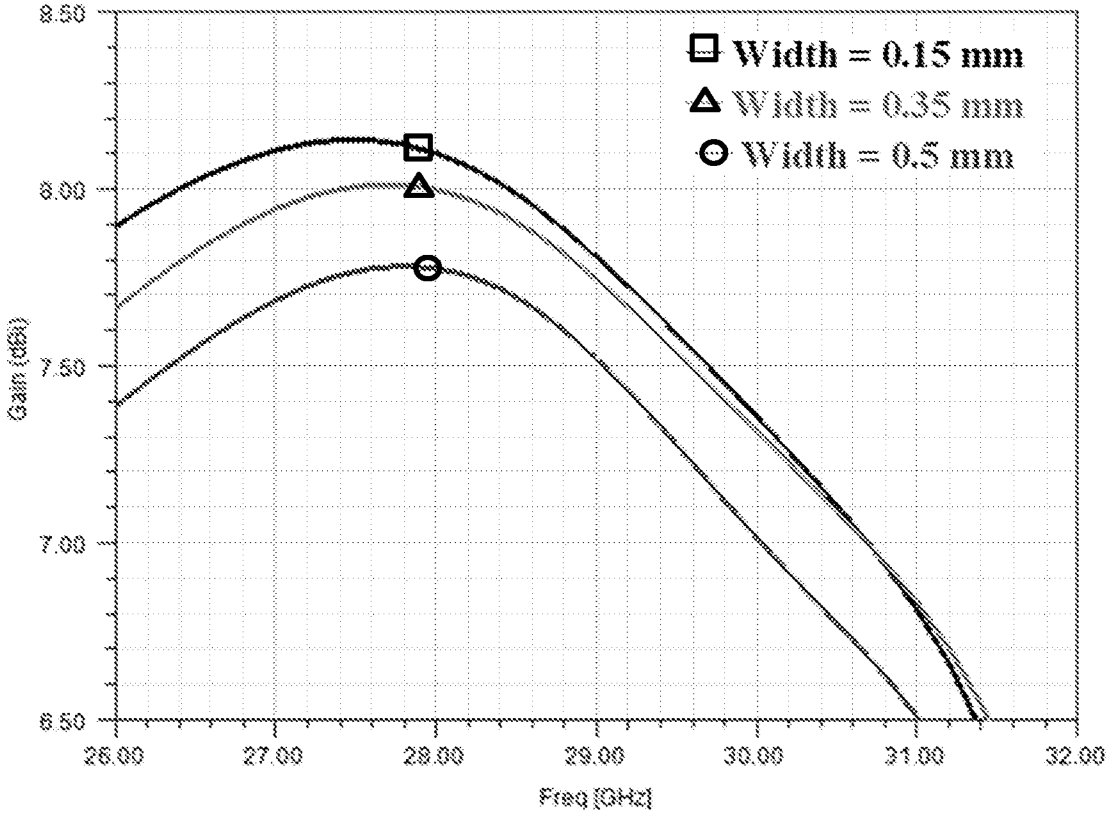
FIG. 11*a* illustrates simulated gain results of a 1×8 antenna that has the same unit design as the antenna in FIG. 1*d* but with various widths of metal strips.
Figure 11B:
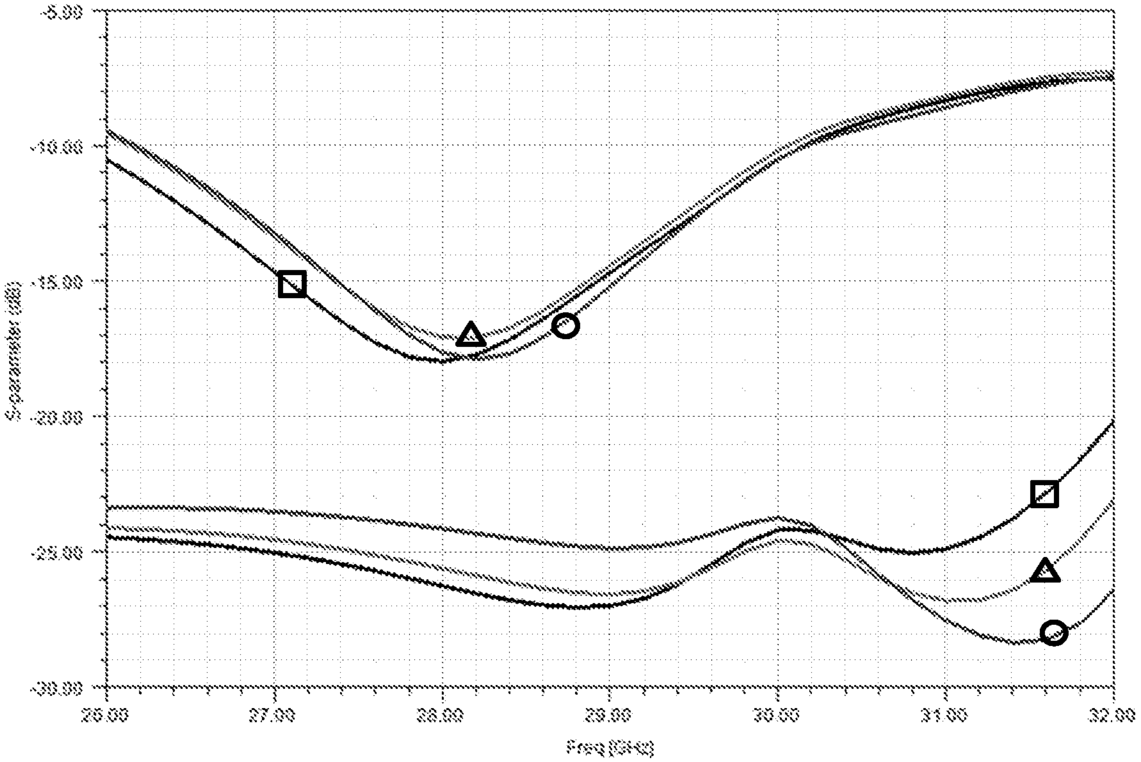
FIG. 11*b* illustrates simulated |S11| and |S21| of the 1×8 antenna of FIG. 11*a*.
Figure 12A:
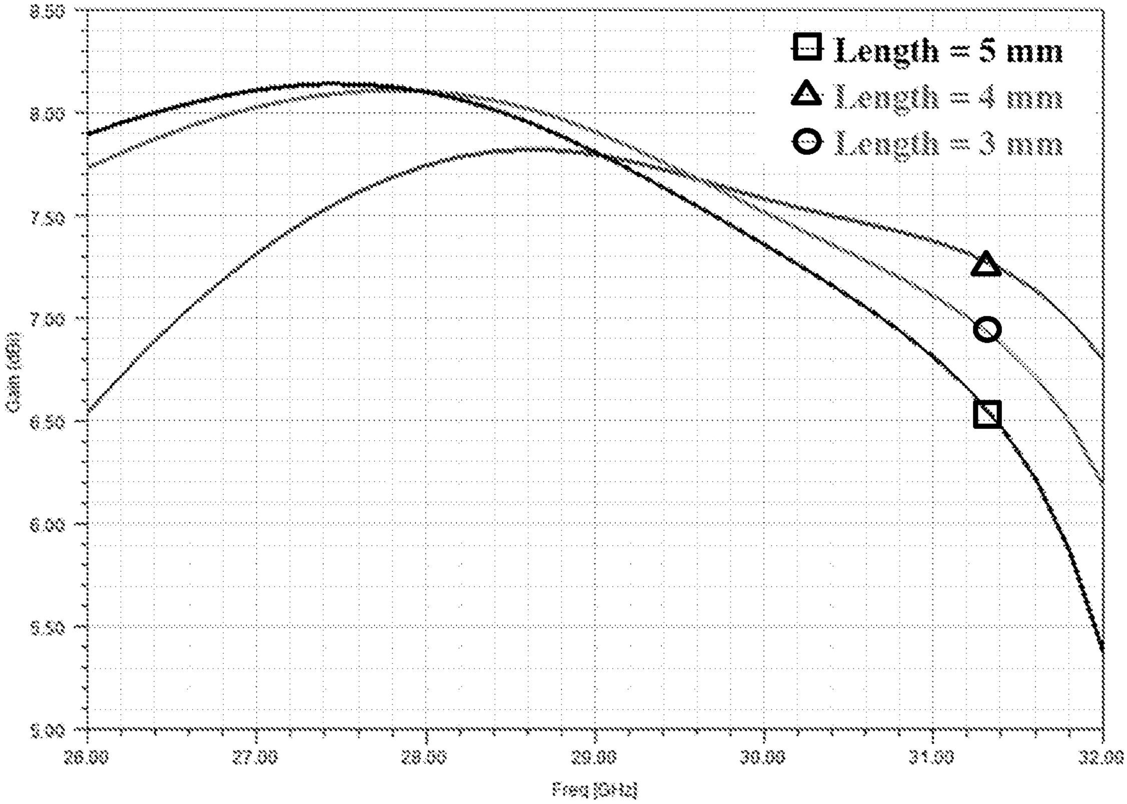
FIG. 12*a* illustrates simulated gain results of a 1×8 antenna that has the same unit design as the antenna in FIG. 1*d* but with various lengths of metal strips.
Figure 12B:
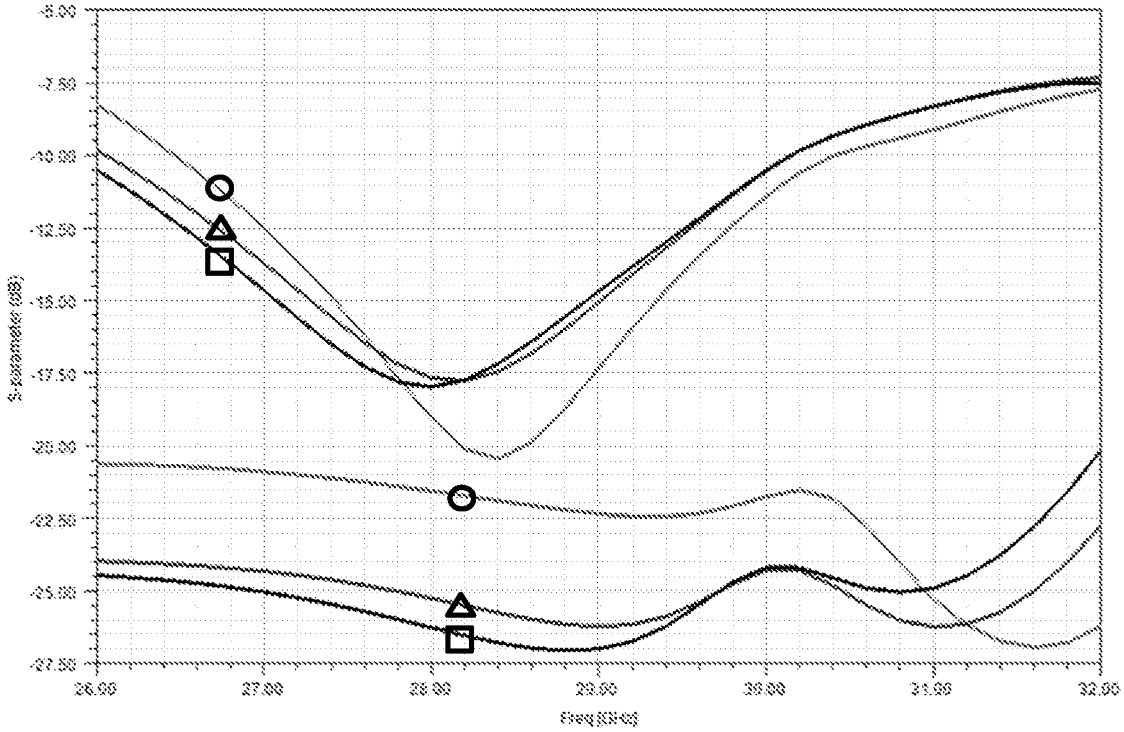
FIG. 12*b* illustrates simulated |S11| and |S21| of the 1×8 antenna of FIG. 12*a*.

Some parameter studies have also been conducted for the metal lines 28 in the antenna 20. FIGS. 11*a* and 11*b* show the simulated S-parameter and gain results of the antenna 20 at different width of each of the metal lines 28. Among the three widths of 0.15 mm, 0.3 mm and 0.5 mm, the width of 0.15 mm provides the best performance. As the width increases, the |S11| has little change while the |S21| becomes lower. Moreover, the gain experiences a little decrease during this rising process. Thus it can be seen that it is not very useful or necessary to increase the width of the metal lines 28. Also, the length of each metal line 28 is another important parameter. As shown in FIGS. 12*a* and 12*b*, the longer length of the metal lines 28 provides better performance, including higher isolation and gain. Among the three lengths of 3 mm, 4 mm and 5 mm, the length of 5 mm provides the best performance. That being said, when the length of the metal lines 28 is too small, all the performances are changed due to the high coupling.

Figure 13:
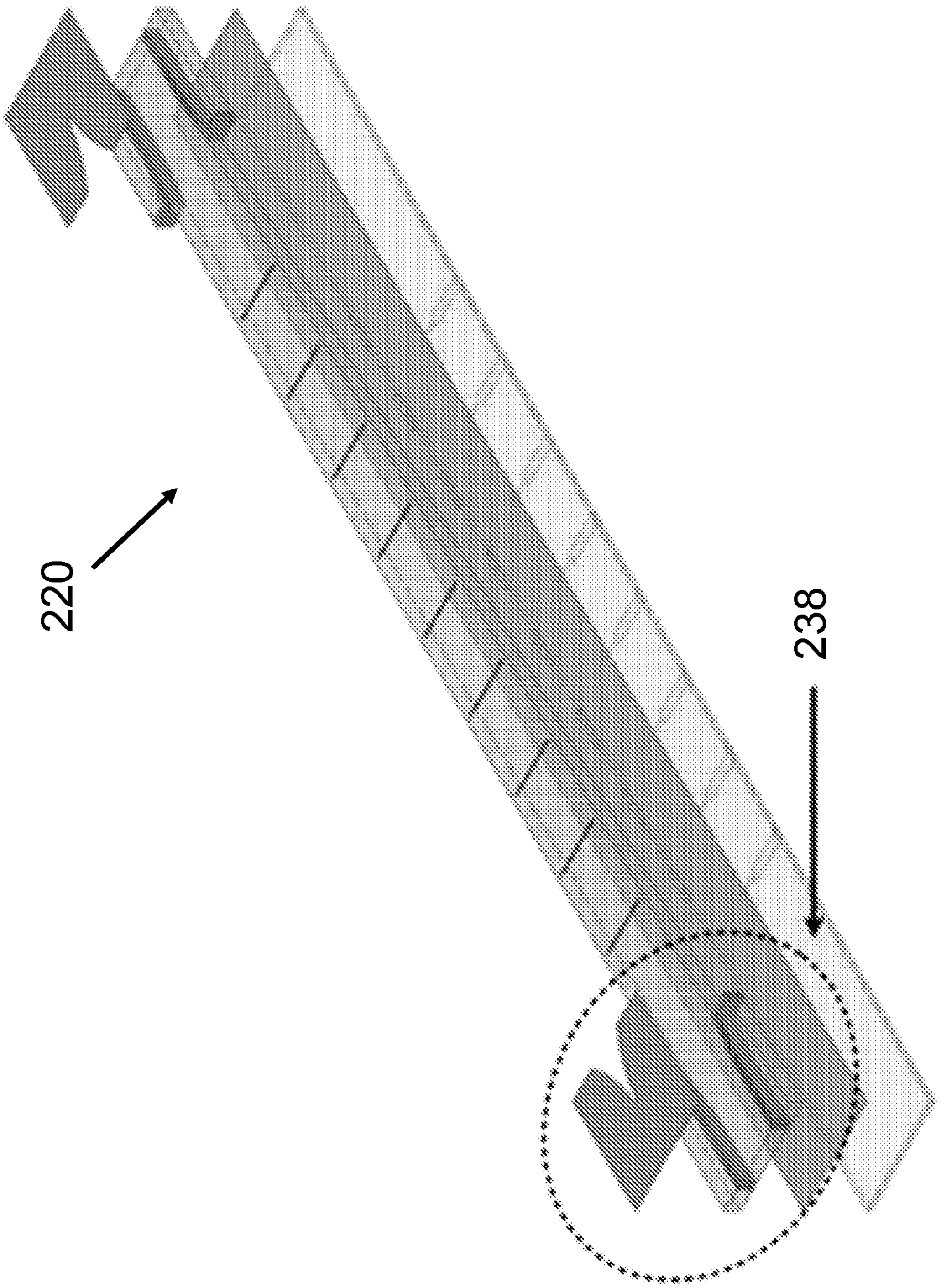
FIG. 13 shows a 1×8 dielectric antenna according to another embodiment of the invention, which has the same unit design as the antenna in FIG. 1*d*, but with SIW-to-DIL ports.

Turning to FIG. 13, which shows an antenna 220 that is based on the antenna 120 in FIG. 3, but with two SIW-to-DIL (substrate integrated waveguide-to-dielectric image line) ports 238 configured at the end of the two sides of a dielectric body 226 that has a rod shape. The SIW-to-DIL ports 238 are added because the antenna 120 is like a leaky-wave antenna based on DIL. The SIW-to-DIL ports 238 provide a travelling-wave mode in the DIL, which is orthogonal to the resonator mode. Hence, the SIW-to-DIL ports 238 provide another radiation pattern without affecting the resonator performance, and the SIW-to-DIL ports 238 are optional. However, it should be pointed out that the radiation performance of the leaky-wave part in the antenna 220 is not totally satisfactory, a possible reason for which being that the perturbation is too small.

For the DIL of the antenna 220, because the direction of the E-field and the slot is the same, the transmission performance of the DIL is acceptable. It is known that the radiation efficiency could increase as the height of the dielectric layer decreases. However, as the dielectric layer is limited by the material of the PCB, there exist leakages from the top surface of the DIL. Therefore, the insert loss is little high. To improve the radiation performance, one attempt will be to increase the number and size of perturbed structure. Normally, one potential difficulty with such antennas is the stopband that occurs when the beam is scanned to broadside. This is a narrow region around broadside, usually known as the open-stopband region, where undesirable scan performances occur. In a practical antenna this means that within this narrow angular region the amount of the radiated power drops substantially, and a large VSWR is encountered.

Figure 14:
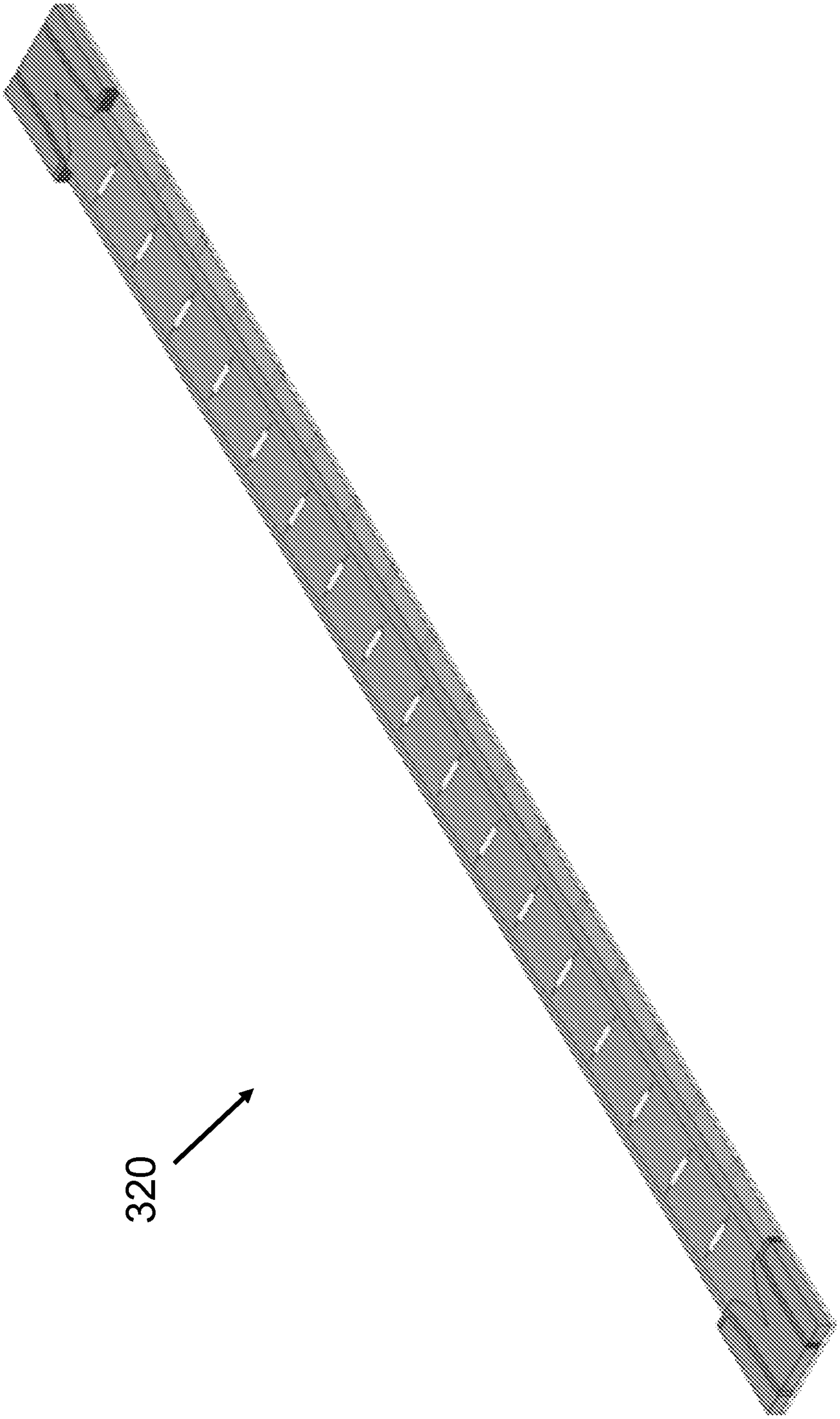
FIG. 14 shows a 1×16 dielectric antenna according to another embodiment of the invention, which has the same unit design as the antenna in FIG. 9.

Turning to FIG. 14, which shows an antenna 320 that is similar to the antenna 220 in FIG. 13, but with 16 antenna elements. The antenna 320 is a dual-function antenna including a leaky-wave antenna and a 1×16 broadside antenna array. As skilled in the art would understand, an arrangement in which the principal direction of radiation is perpendicular to the array axis and also to the plane containing the array element is called a broadside antenna. For the broadside part, all the performance is all good besides the presence of a high back lobe. The drawback can be improved by re-designing a feeding network. On the other hand, it is predicted that the leaky-wave part has a problem of open stop-band phenomena. The peak gain around 26.5 GHz would decrease about 4 dBi.

Figure 15A:
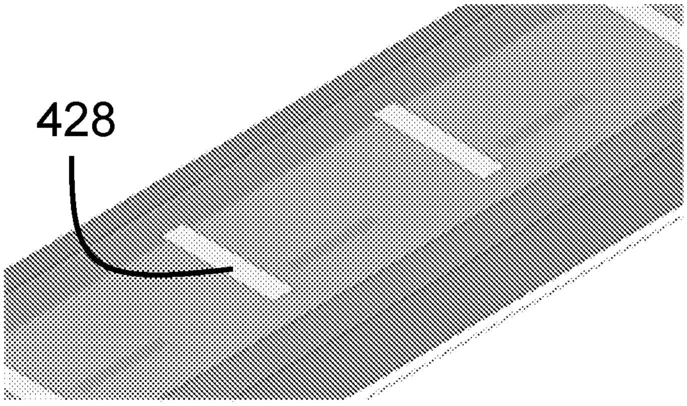
FIGS. 15*a*, 15*b*, 15*c*, 15*d*, 15*e* and 15*f* illustrate respectively different perturbed structures according to embodiments of the invention that are applicable to the dielectric antennas.
Figure 15B:
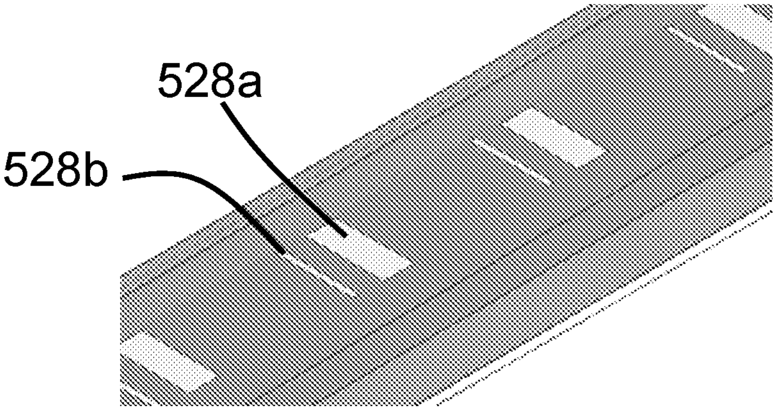
Figure 15C:
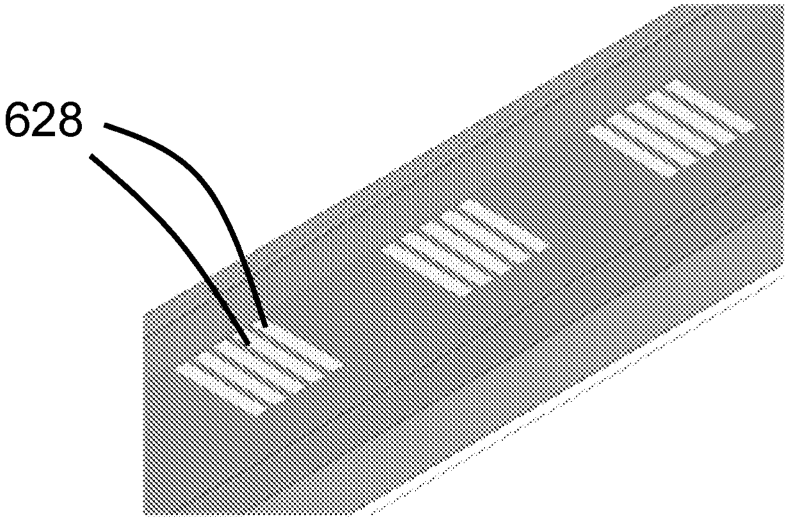
Figure 15D:
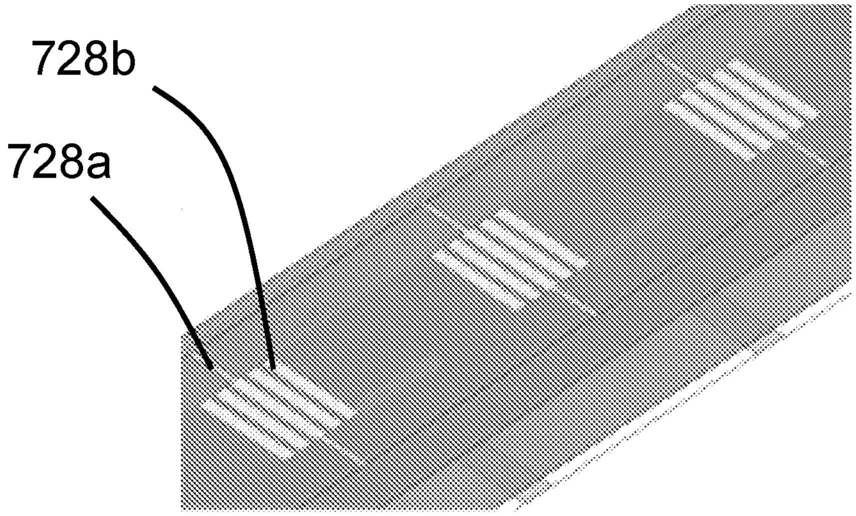
Figure 15E:
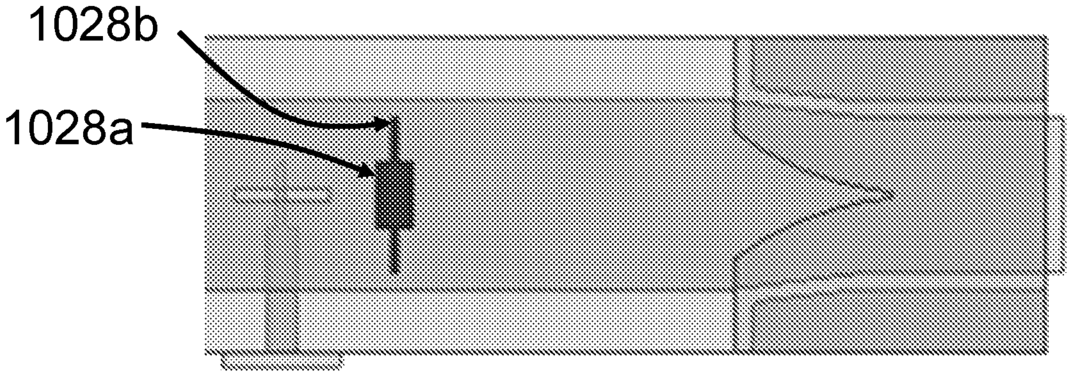
Figure 15F:
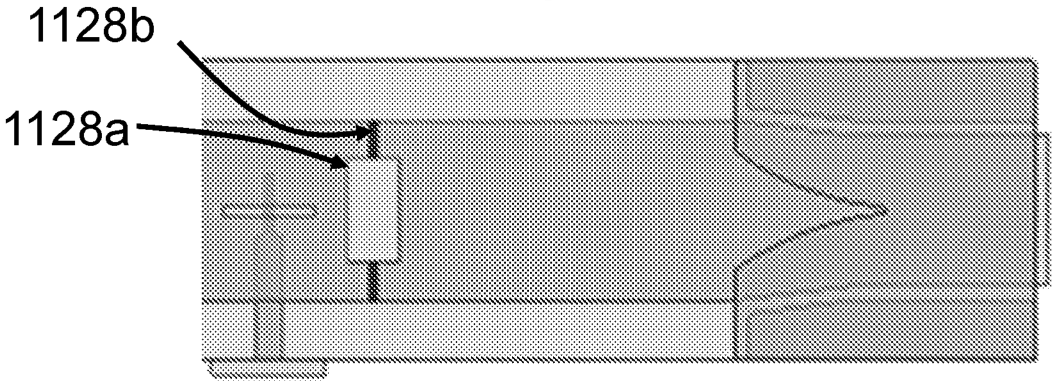

To overcome the above drawbacks in the antenna 220, and also those of the antennas in FIGS. 1*d* and 2, FIG. 3, different types of perturbed structures have been considered and simulated. FIGS. 15*a*-15*f* show some of these perturbed structures, and in particular FIG. 15*a* shows widened metal lines 428 (as compared to that in FIGS. 1*d*, 2, 3 and 13. FIG. 15*b* shows a metal line 528*b* by the side of a rectangular patch 528*a*. FIG. 15*c* shows multiple parallel metal lines 628 in close vicinity to each other. FIG. 15*d* shows two wider metal lines 728*b* on each of two sides of a central, narrower metal line 728*a*. FIG. 15*e* and FIG. 15*f* show a metal line 1028*b*, 1128*b* overlapping with a rectangular patch 1028*a*, 1128*a*. However, none of the perturbed structures in FIGS. 15*a*-15*d* could provide balance good results for both the leaky-wave part and the standing wave part. This is because of the perturbed structures and shorter distance between them, and the resonator frequency increases while a drop of radiation appears in the bandwidth. According to the radiation pattern, the reason for this drop is that there exists a coupling between the DRA and the metal strip, so that an undesired E-field distribution results in a high side-lobe and lower directivity.

Figure 16:
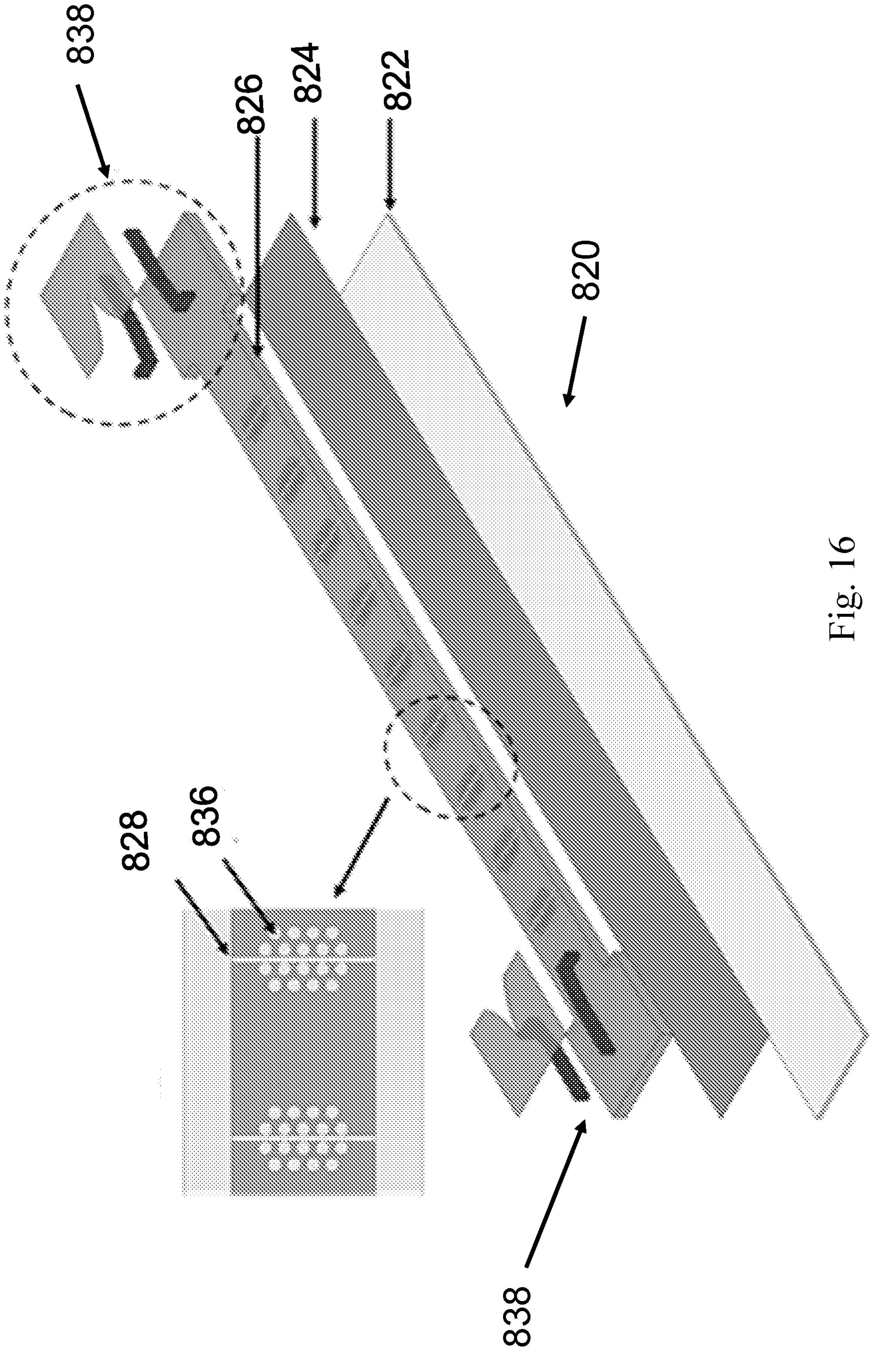
FIG. 16 illustrates the structure of a 1×8 dielectric antenna which contains air vias in the perturbed structures according to another embodiment of the invention.

Turning to FIG. 16, an antenna 820 is in general similar to the antenna 220 in FIG. 13, and similar structures and components will not be described herein again for the sake of brevity. Rather, only features in the antenna 820 which are different from those in FIG. 13 will be described. The antenna 820 also has a three-layer structure including a substrate layer 822, a ground layer 824 and a dielectric body 826, but the perturbation structure in the antenna system 820 is different from that in FIG. 13.

In particular, on top of the dielectric body 826, several rows of air vias 836 have been employed adjacent to each metal line 828 to obtain good leaky-wave performance. In each group, the air vias 836 are symmetrically located on two sides of the metal line 828. For example, from the insert of FIG. 2 which is an enlarged view of two metal lines 828 and their adjacent air vias 836, one can see that on each of the two sides of a metal line 828 there are two rows of air vias 836, with a total number of nine. The row closer to the metal line 828 has five air vias 836, and the row further to the metal line 828 has four air vias 836. In each row, the air vias 836 are distributed equidistantly from each other. All the air vias 836 have substantially the same diameter.

Compared to that in the antenna 220 in FIG. 13, the perturbation structure in FIG. 16 achieves a better perturbing effect. Another way to improve the perturbing effect for the antenna system in FIG. 13 is to increase the width of the metal lines (i.e., the dimension of the metal lines along the longitudinal direction of the dielectric body) on top of the dielectric body. However, increasing the width of the metal line will deteriorate the performance of the standing wave antenna section. Thus, as a preferable way the rows of air vias 836 are employed to obtain good leaky-wave performance, and the symmetrical non-metallic structure has a few impact on the standing-wave part. The air vias also provide perturbation without creating a coupling between the DRA.

Figure 19A:
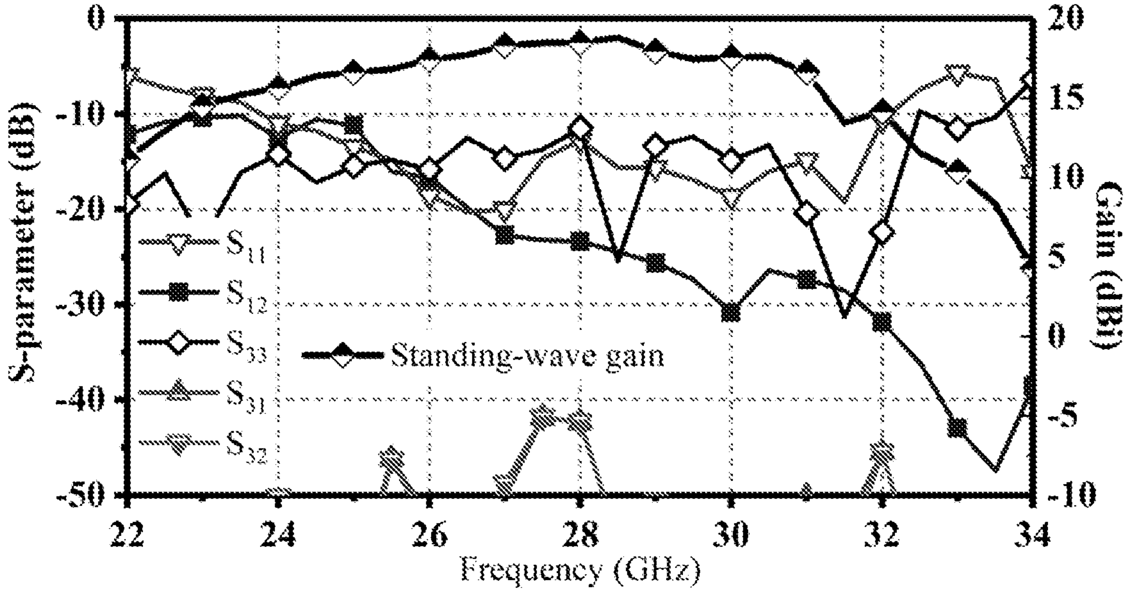
FIG. 19*a* depicts the S-parameter performance of the antenna in FIG. 18.
Figure 19B:
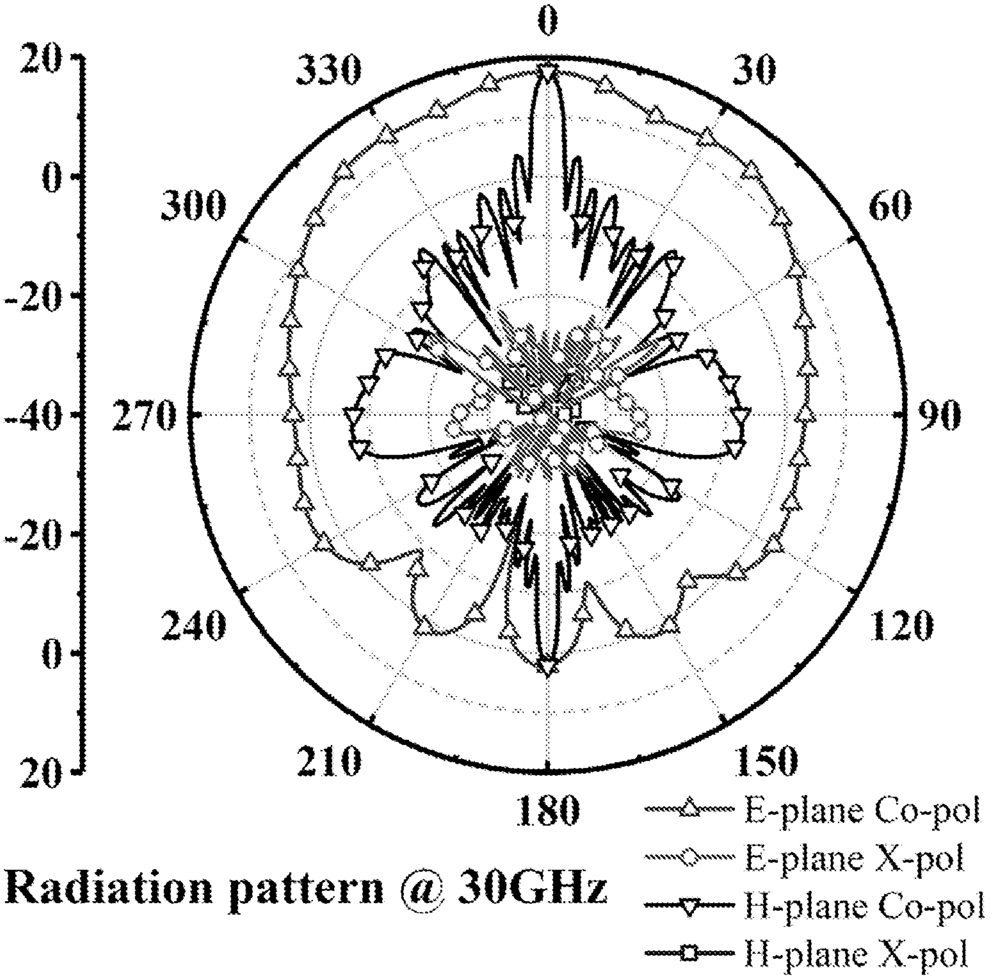
FIG. 19*b* depicts the standing-wave radiation performance of the antenna in FIG. 18.
Figure 19C:
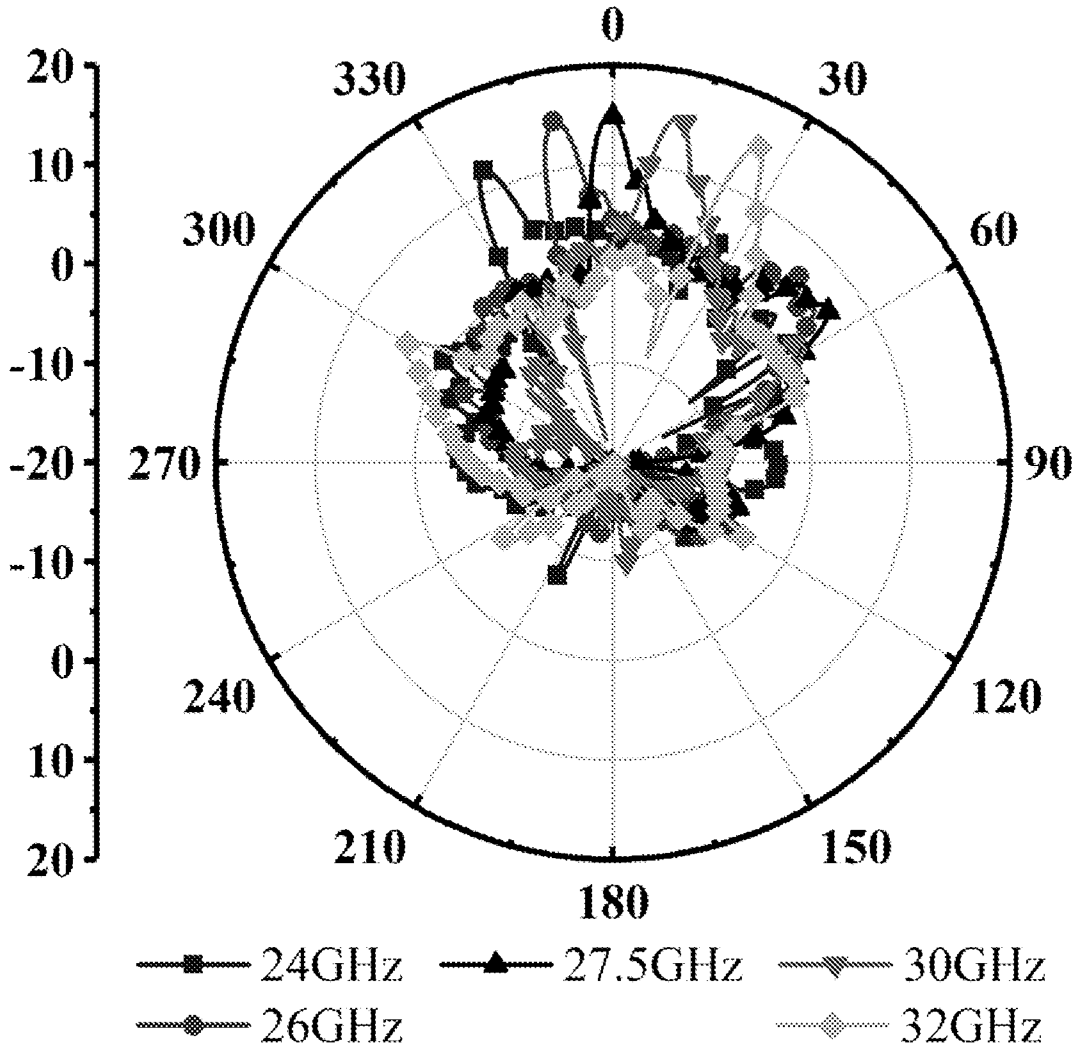
FIG. 19*c* depicts the leaky-wave radiation performance of the antenna in FIG. 18.

Replacing the huge air region with group vias/holes make it easier to fabricate, which is also good for the open stop-band phenomenon. As shown in FIGS. 19*a*-19*c*, performances of both the LWA and SWA are acceptable. For the leaky-wave part, the open stop-band problem has been solved so that it is adapted to provide a continuing scanning from back to front. For the resonator part, it is just like the traditional DRA array with a >20 dB isolation, and the influence of the perturbation appears to be out of the operating bandwidth.

By carefully designing control parameters of the antenna system 820, leaky-wave and standing-wave radiations can be obtained in the same dielectric body 826. A directive radiation pattern to the broadside can be produced from the summation of the radiating electric fields of the partitioned DRA elements. The directive radiation pattern can be used for good communications between base stations and targeted users. The radiating pattern of the leaky-wave mode in this antenna brings a frequency-scanning characteristic with a wide angular scan across its operating bandwidth. This kind of frequency-scanning radiation pattern can detect or sense moving objects within the network. Therefore, it is possible to realize a wide angular scan with a wide frequency range for sensory signals of an ISAC network. As a result, the antenna 820 is adapted to generate communication and sensing beams at the same time.

Figure 17A:
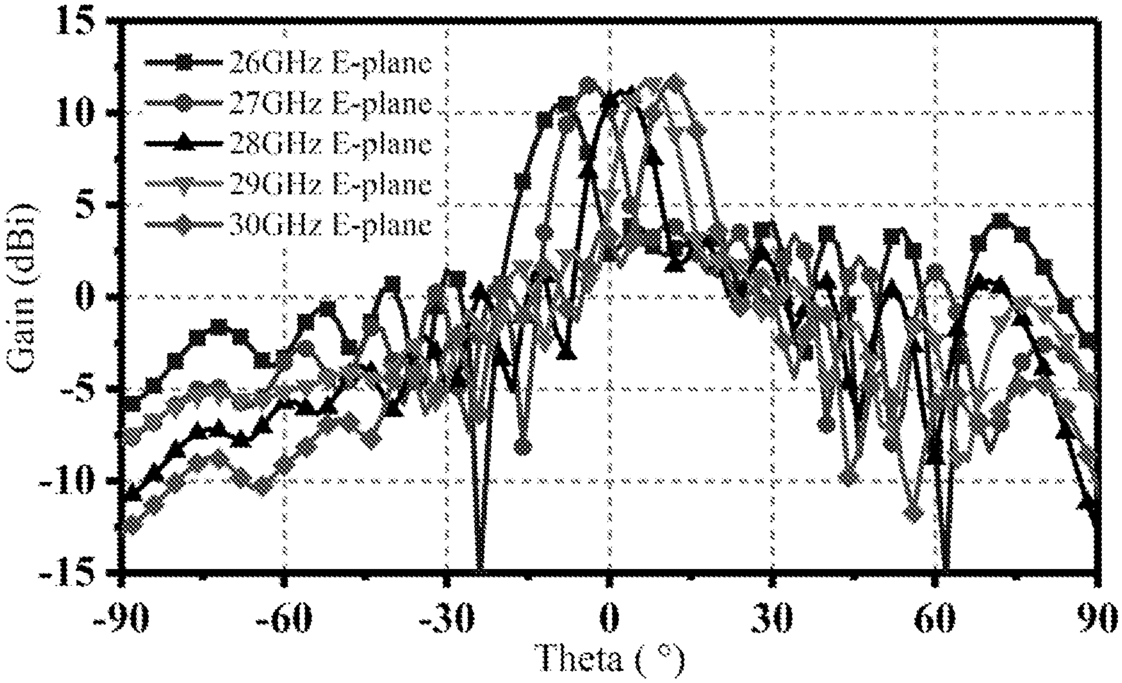
FIG. 17*a* depicts the standing-wave radiation performance of the antenna in FIG. 16.
Figure 17B:
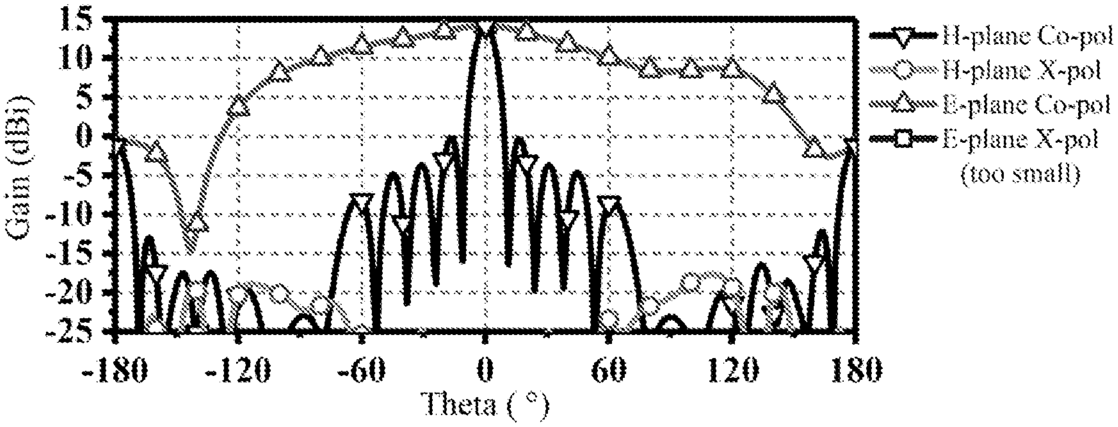
FIG. 17*b* depicts the leaky-wave radiation performance of the antenna in FIG. 16.

A trial simulation has been performed by study of different antenna systems with two to eight antenna elements. FIGS. 17*a* and 17*b* depict respectively the standing-wave radiation performance and the leaky-wave radiation performance of the antenna 820. One can see from FIG. 17*a* that the antenna 820 is able to produce a directive radiation pattern from its standing-wave mode, and from FIG. 17*b* it can be seen that the antenna 820 also produces a nice frequency-scanning radiation patterns from the leaky-wave mode.

Except the radiation performance, the isolation between the each part is also very important to the antenna system. When designing ISAC antenna arrays, one must consider eliminating the interference between two signals of sensing and communication (S&C) sub-systems. The time-grating method is one of commonly-used solutions in the recent ISAC to provide sufficient isolations for the S&C signals. It however brings major disadvantages for the ISAC system with a significant latency, particularly when the sensing frames are increased in the system for better resolution and accuracy for object differentiation and definition. To achieve this objective, it is proposed herein to build up a high-isolation antenna array with leaky-wave and standing-wave modes. It is well-known that a good antenna array with dual-polarization or dual-operating modes must tackle the array's mutual couplings among radiating elements. The radiation pattern along the x-axis excitation is from its leaky-wave mode while the standing-wave mode is from the excitation of the y-axis direction. As the two modes are intersecting orthogonal, the mutual couplings among radiating elements is small enough.

Figure 18:
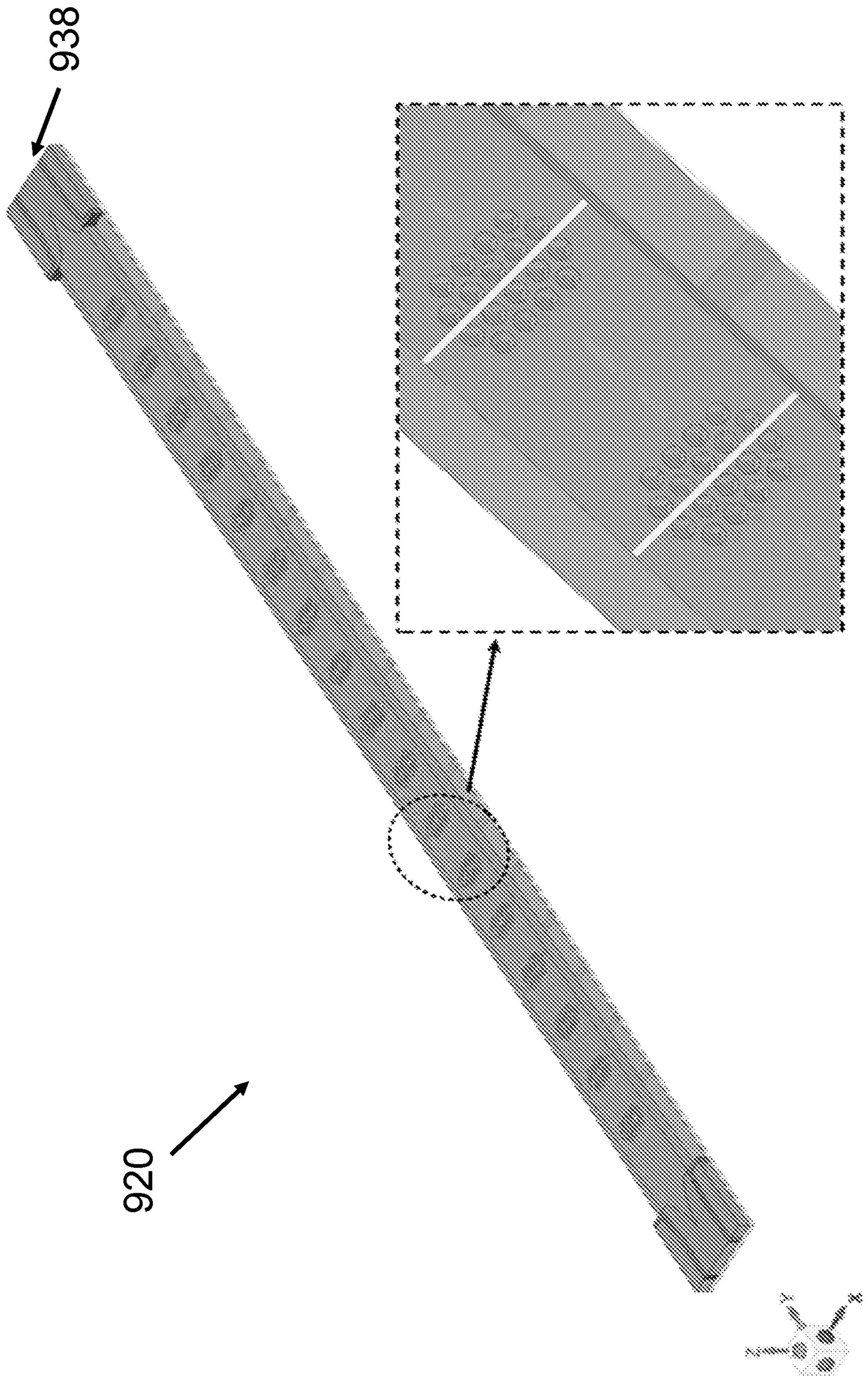
FIG. 18 illustrates the structure of a 1×16 dielectric antenna which contains air vias in the perturbed structures according to another embodiment of the invention.

In another embodiment of the invention, there is thus proposed a configuration including building up two individual power dividers to link up the sub-array elements for S&C ports correspondingly. FIG. 18 shows an antenna 920 with such a configuration, where Port 1 and Port 2 (i.e. the two ports 938) are at the two ends of the dielectric rod for leaky-wave radiation, similar to that shown in FIG. 16. However, compared to the antenna in FIG. 16 which has eight antenna elements, the antenna 920 has sixteen antenna elements, and thus it forms a 1-16 power divider to excite the standing-wave radiation. The preliminary result of the antenna 920 confirms that the port-to-port isolation can yield over 40 dB (see FIG. 19*a*) across the wide operating bandwidth of the array. This high isolation level can provide low interference S&C signals in an ISAC antenna system between the sensing and the communication ports. The operating bandwidth of this array ranging from 24 GHz to 32 GHz. In addition, the purity of the radiation pattern of the proposed array is very high. Both modes obtain low-cross polarizations in radiation patterns (see FIG. 19*b* and FIG. 19*c*).

Figure 20:
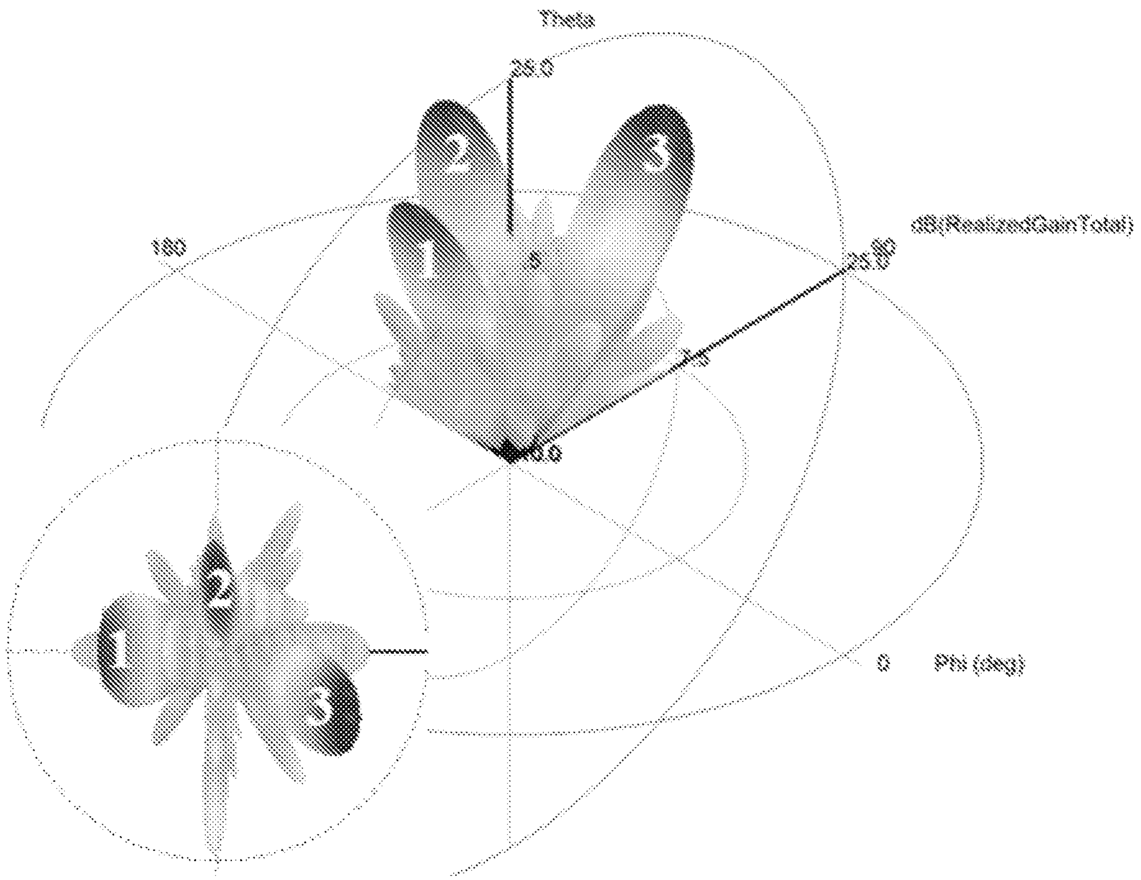
FIG. 20 shows the sensing beam manipulation of a leaky-wave mode of a dielectric antenna according to a further embodiment of the invention.
Figure 21A:
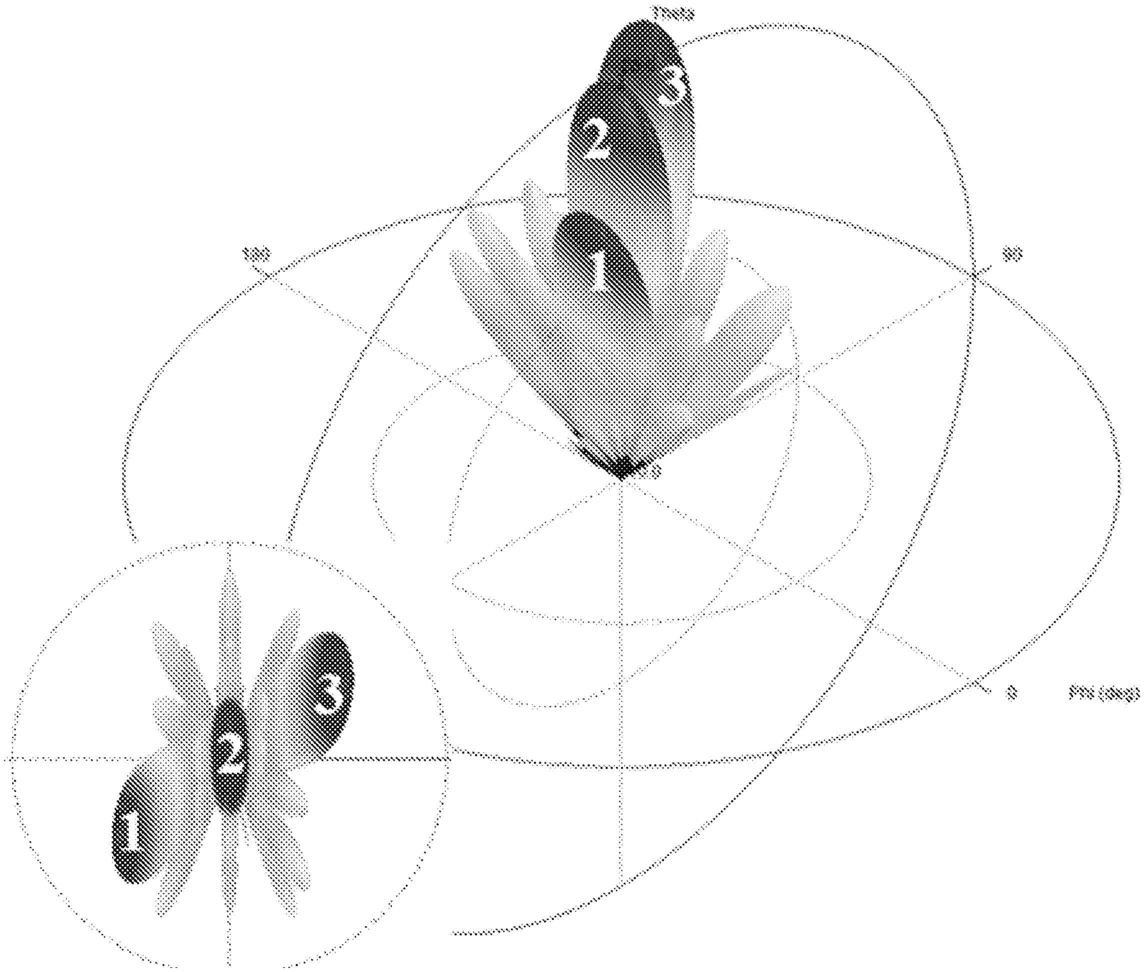
FIG. 21*a* shows the communication beam manipulation of a standing-wave mode of the antenna of FIG. 20.
Figure 21B:
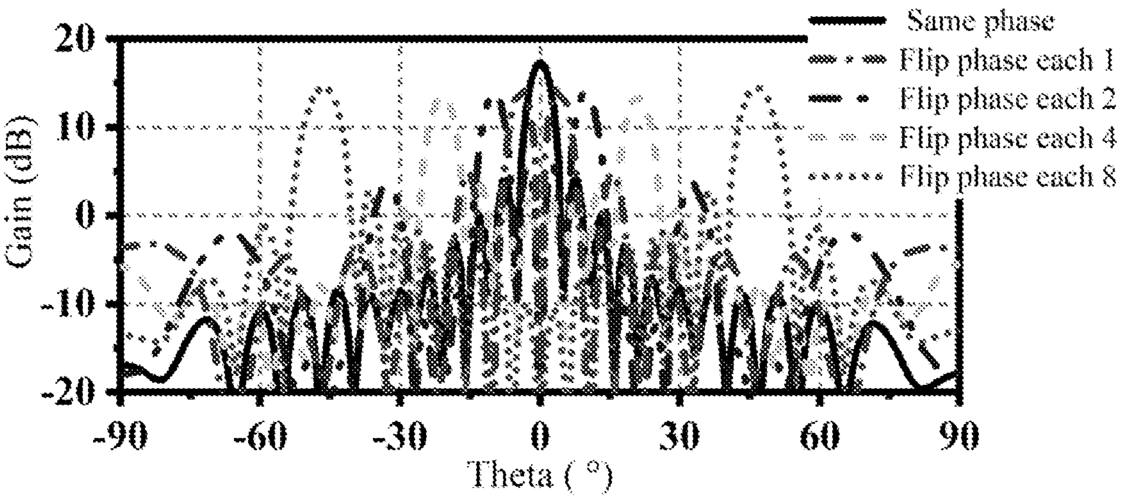
FIG. 21*b* shows the radiation pattern of the antenna of FIG. 21*a* at different beam angles, when phase flipping are applied to different numbers of antenna elements in the antenna.
Figure 21C:
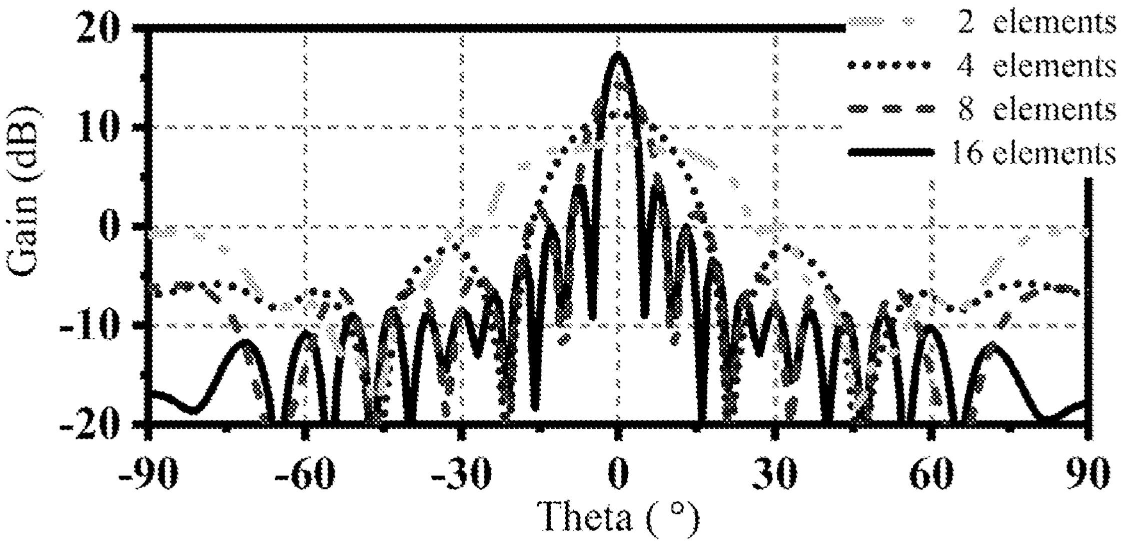
FIG. 21*c* shows the radiation pattern of the antenna of FIG. 21*a* at different beam angles, when different numbers of antenna elements in the antenna are excited.

Based on the good preliminary results, the following items are identified to be carried to improve the performance of the antenna array including (1) the study of bandwidth enhancement for antenna elements for the array, (2) pattern enhancement for side-lobe and back-lobe suppressions, (3) feasibility study in circular-polarized antenna array for indoor ISAC applications, and (4) the study of a MIMO array based on the proposed subarray design. It is suggested to introduce two reconfigurable networks connecting with the antenna array for individual controls of the sensing and communication reconfigurable radiating beams. From preliminary results, one can realize a wide angular scanning range controls for the frequency-scanning beam at the sensing port of this antenna array. The conventional frequency-scanning range from a leaky-wave antenna is determined by the fixed structure of the leaky-wave body of the antenna. A piece of additional phase information to the reconfigurable network is applied to achieve dynamic angular-scanning controls for the leaky-wave radiation pattern. The simulation result confirms this good approach for the beam manipulation (see FIG. 20) of the leaky-wave mode of the antenna array. The radiation pattern can be effectively controlled in horizontal and vertical cutting planes. For the communication port of this antenna array, another reconfigurable network with amplitude and phase controls can apply to manipulate the communication radiation pattern with beam directing/steering/tilting (see FIG. 21*a*), beam splitting (see FIG. 21*b*), and beam splitting with different beam widths (see FIG. 21*c*). In FIG. 21*b*, the different curves indicate the gain results when a different number of antenna elements in the antenna have a reversed phase. For example, "Flip phase each 2" means that in an example of 16 antenna elements, the $1^{st}$ and $2^{nd}$ elements have an original phase, but the $3^{rd}$ and $4^{th}$ elements have an reversed phase, and then the $5^{th}$ and $6^{th}$ elements have the original phase again, and so on. In FIG. 21*c*, the different curves indicate the gain results when a different number of antenna elements in the antenna are excited. For example, "4 elements" means that in an example of 16 antenna elements, only 4 of them are excited, but the other ones are not excited.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, the microstrip feedlines are shown with various shapes, such as those shown in FIG. 2 and FIGS. 15*a*-15*d*. One should understand that the invention is not limited by these shapes of the feedlines. Rather, microstrip feedlines of other shapes can also be configured in the antennas. The invention is furthermore not limited by the excitation method of the DRA, i.e., slot feed, conformal feed, probe feed or any other suitable method can be used.

In some embodiments described above, the air vias help improve the traveling-wave part of the antenna and has little impact on resonator part. However, the air vias are not the only form of perturbing structure that can be used. The essence is that the air window can enhance the disturbance, so it doesn't have to be a porous structure. In other variations, it could be a whole big rectangular air window.

What is claimed is:

1. A dielectric antenna, comprising:

a) a substrate layer;

b) a ground layer on top of the substrate layer; and c) a dielectric body on top of the ground layer, wherein the dielectric body has an elongated shape; the dielectric antenna further comprising an electric wall structure on a top of the dielectric body for cutting links among higher-order modes in a resonating part of the dielectric antenna; wherein the electric wall structure comprises a metal line configured on the top of the dielectric body; and wherein the dielectric body is formed of a first coplanar waveguide feeding port at a first end of the dielectric body, and a second coplanar waveguide feeding port at a second end of the dielectric body; the first coplanar waveguide feeding port and the second coplanar waveguide feeding port being adapted to collectively feed a plurality of antenna elements defined in the dielectric body; the plurality of antenna elements forming a leaky-wave antenna.

2. The dielectric antenna of claim 1, wherein the metal line is substantially perpendicular to a longitudinal direction of the dielectric body.

3. The dielectric antenna of claim 1, wherein the electric wall structure further comprises a plurality of air vias on the dielectric body which is adjacent to the metal line.

4. The dielectric antenna of claim 3, wherein the plurality of air vias is symmetrically located on two sides of the metal line.

5. The dielectric antenna of claim 1, wherein the electric wall structure comprises a plurality of said metal lines which is parallel to each other and which is perpendicular to a longitudinal direction of the dielectric body.

6. The dielectric antenna of claim 5, wherein the plurality of metal lines is distributed equidistantly from each other.

7. The dielectric antenna of claim 6, wherein the plurality of antenna elements each corresponds to one of the plurality of metal lines; the plurality of antenna elements bordering each other at one of the plurality of metal lines.

8. The dielectric antenna of claim 1, wherein the substrate layer comprises a first microstrip feedline and a second microstrip feedline; the ground layer comprising a first coupling slot that has a longitudinal direction intersecting with that of the first microstrip feedline, and a second coupling slot that has a longitudinal direction intersecting with that of the second microstrip feedline.

9. The dielectric antenna of claim 8, wherein the first microstrip feedline and the second microstrip feedline correspond respectively to a first antenna element and a second antenna element among the plurality of antenna elements; the first and second antenna elements bordering each other at the metal line.

10. The dielectric antenna of claim 1, wherein the plurality of antenna elements further forms a standing-wave antenna.

* * * * *